United States Patent [19]
Okuyama et al.

[11] Patent Number: 5,648,871
[45] Date of Patent: Jul. 15, 1997

[54] PROJECTION APPARATUS UTILIZING AN ANAMORPHIC OPTICAL SYSTEM

[75] Inventors: Atsushi Okuyama, Tokyo; Hideo Yokota, Yokohama; Katsumi Azusawa, Konosu, all of Japan

[73] Assignee: Canon Kabushiki Kaisha, Tokyo, Japan

[21] Appl. No.: 375,505

[22] Filed: Jan. 18, 1995

Related U.S. Application Data

[63] Continuation of Ser. No. 905,104, Jun. 26, 1992, abandoned.

[30] Foreign Application Priority Data

| Jun. 28, 1991 | [JP] | Japan | 3-158478 |
| Sep. 30, 1991 | [JP] | Japan | 3-278792 |
| Nov. 8, 1991 | [JP] | Japan | 3-321263 |

[51] Int. Cl.$^6$ .................................. G02B 27/64
[52] U.S. Cl. .................. 359/557; 359/651; 359/720; 359/648
[58] Field of Search ........................ 359/669, 650, 359/651, 670, 671, 649, 720, 648, 668, 678, 554–557

[56] References Cited

U.S. PATENT DOCUMENTS

| 2,795,996 | 6/1957 | Sauer | 359/668 |
| 3,751,136 | 8/1973 | Kirchhoff | 359/670 |

FOREIGN PATENT DOCUMENTS

| 48-24048 | 7/1973 | Japan . |
| 54-118244 | 9/1979 | Japan . |
| 62-17201 | 4/1987 | Japan . |

*Primary Examiner*—Ali Neyzari
*Assistant Examiner*—Thomas Robbins
*Attorney, Agent, or Firm*—Fitzpatrick, Cella, Harper & Scinto

[57] ABSTRACT

A projection apparatus in which in order that an original image, which is compressed in a horizontal direction, may be projected onto a screen at a predetermined location by a master lens, the original image is disposed with the center thereof deviated relative to the optical axis of the master lens and in which an anamorphic lens having an optical axis inclined with respect to the optical axis of the master lens and having refractive power in a horizontal direction is disposed on the screen side of the master lens.

8 Claims, 22 Drawing Sheets

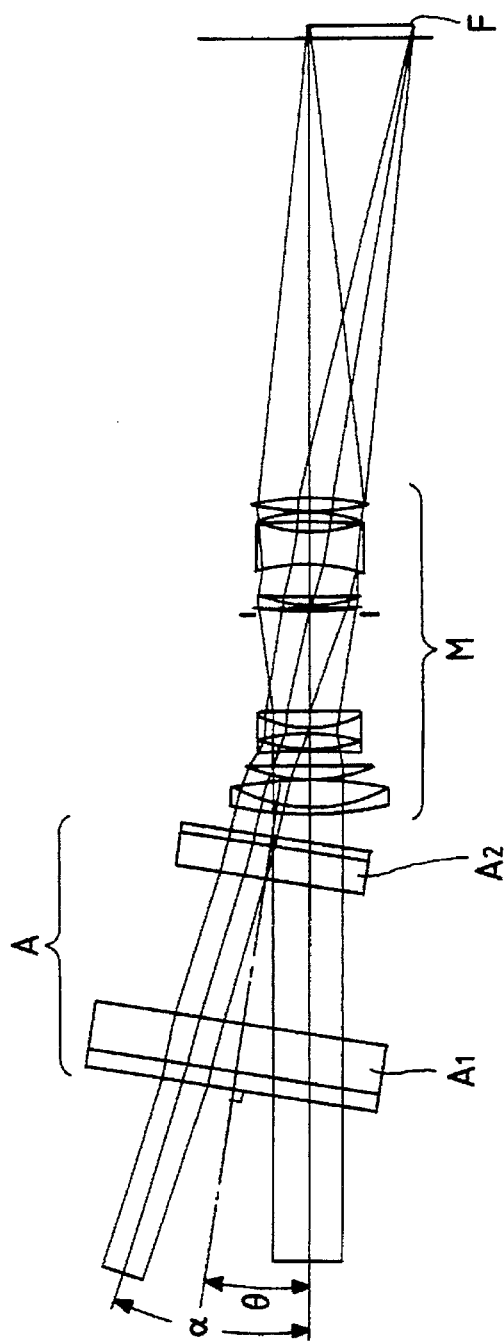
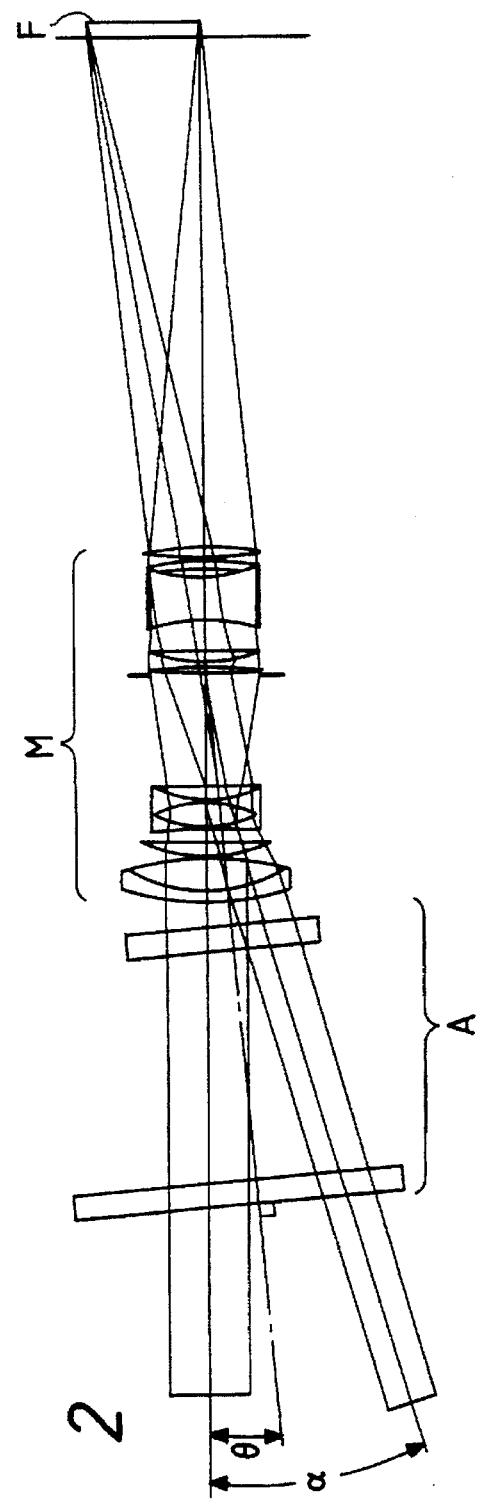
FIG. 1
FIG. 2

ON-AXIS                                           OFF-AXIS

ON-AXIS                                           OFF-AXIS

VERTICAL SECTIONAL VIEW

HORIZONTAL SECTIONAL VIEW

ON-AXIS                      OFF-AXIS

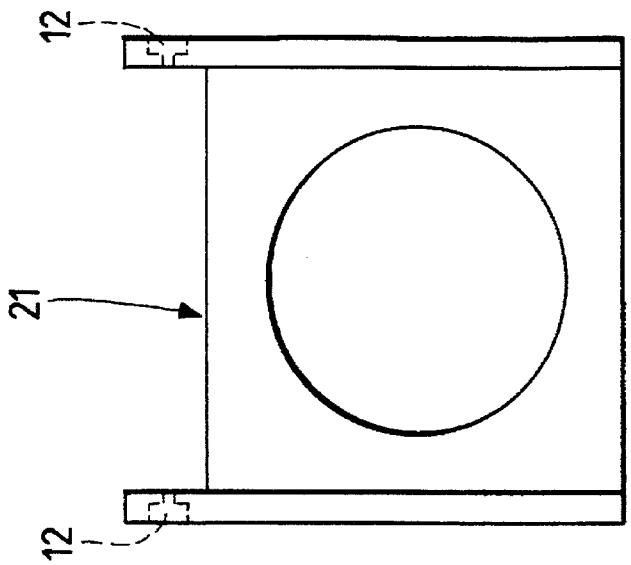
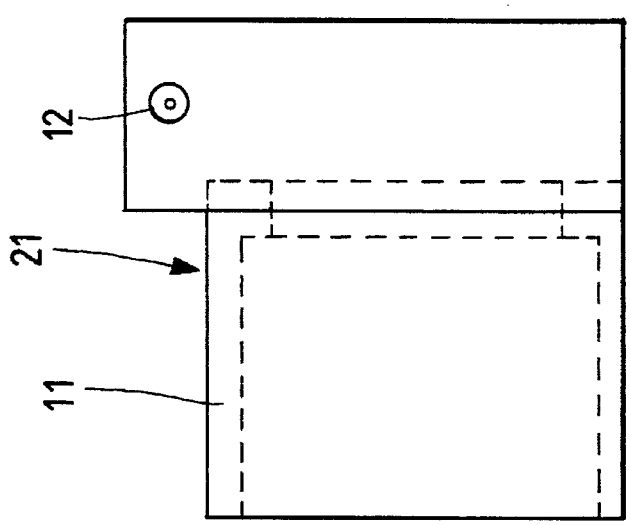
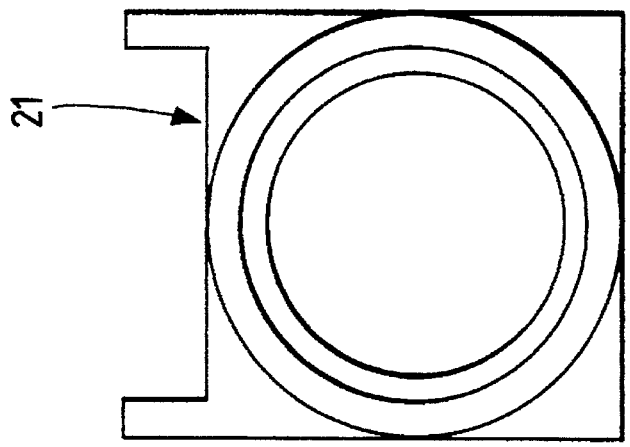

PROJECTION APPARATUS UTILIZING AN ANAMORPHIC OPTICAL SYSTEM

This application is a continuation of application Ser. No. 07/905,104 filed Jun. 26, 1992, now abandoned.

BACKGROUND OF THE INVENTION

1. Field of the Invention

This invention relates to a projection apparatus having an anamorphic optical system, and particularly to a projection apparatus in which an image is compressed and recorded in one direction, for example, a horizontal direction when the image is projected onto the surface of a screen. The image is used as a projected image (a projected optical element) and is laterally enlarged and widely projected onto the surface of the screen.

2. Related Background Art

A projection apparatus in which an image, compressed and recorded in a horizontal direction, is used as a projected image and which has an anamorphic optical system and a projection system (a master lens system) and in which the image is laterally enlarged and widely projected onto the surface of a screen has heretofore been proposed, for example, in Japanese Patent Publication No. 48-24048 and Japanese Patent Publication No. 62-17201.

A projection optical system of the converter type added to the master lens system will hereinafter be described with reference to FIGS. 9 and 10 of the accompanying drawings. FIG. 9 is a vertical sectional view of the projection optical system, and FIG. 10 is a horizontal sectional view of the projection optical system. The letter A designates an anamorphic lens system, the letter M denotes a master lens system, and the letter F designates a projected optical element such as liquid crystal.

The anamorphic lens system A comprises a cylindrical lens unit having negative refractive power in a horizontal direction and a cylindrical lens unit having positive refractive power in a horizontal direction, and is provided in parallel to the optical axis of the master lens system M, and the image of the projected optical element F is enlarged by the master lens system M, and is further enlarged in a horizontal direction by the anamorphic lens system A and projected.

In some cases, however, the projected image element such as liquid crystal or film is disposed while being deviated in a vertical direction relative to the optical axis of the master lens system so that the image of the image element to be projected may be projected upwardly. In the case of such a projection optical system, a large quantity of light fluxes pass through one side of the anamorphic lens system, and this tends to cause the angle at which the off-axis light flux in the vertical direction of the cylindrical lens that is incident on the anamorphic lens system to become great and cause off-axis aberrations, particularly astigmatism, to increase. This state is shown in the spot diagram of FIG. 11 of the accompanying drawings. It can be well seen that as the vertical height of the image point becomes greater, the spot becomes wider and blur is created in the upper portion or the lower portion of the projected image plane.

Also, generally in a projection apparatus designed such that a projected image is disposed while being shifted in a vertical direction relative to the optical axis of a projection system and is projected in an oblique direction asymmetric to the optical system, a light ray on one side of projected light rays becomes far from a stop and becomes more separate from the optical axis. Therefore, a great distortion of the image field is created in only one side of the picture plane and this becomes an asymmetric distorted projected image.

The mounting of an additional optical system such as a wide converter onto such a projection apparatus has given rise to the problem that as shown in FIG. 40B of the accompanying drawings, the projected image 12a becomes more distorted and is difficult to observe.

SUMMARY OF THE INVENTION

A first object of the present invention is to solve the above-noted problems and to provide a projection optical system which maintains a good optical performance.

A second object of the present invention is to provide a projection optical system in which even when a zoom lens is used as the projection optical system, the fluctuations of aberrations by zooming are suppressed.

BRIEF DESCRIPTION OF THE DRAWINGS

FIG. 1 shows the optical path of numerical value embodiment 1 of the present invention in a vertical cross-section thereof.

FIG. 2 shows the optical path of numerical value embodiment 2 of the present invention in a vertical cross-section thereof.

FIGS. 26A to 26C illustrate angle setting means in the first embodiment of the present invention.

DESCRIPTION OF THE PREFERRED EMBODIMENTS

Referring to FIG. 1 which shows the optical arrangement of a projection optical apparatus representing the present invention best, the letter A designates an anamorphic lens system comprised of a cylindrical lens unit A1 having negative refractive power in a horizontal direction and a cylindrical lens unit A2 having positive refractive power in a horizontal direction, and the letter M denotes a master lens system having a plurality of spherical lenses. The anamorphic lens system A is disposed with an inclination of a predetermined angle $\theta$ with respect to the optical axis of the master lens system M. F designates an original image forming element such as liquid crystal on which an image is formed while being compressed in a horizontal direction. By this forming element being disposed with its center shifted relative to the optical axis of the master lens system, an original image is projected onto a screen positioned at a desired location.

By the anamorphic lens system A being thus endowed with an angle with respect to the optical axis of the master lens system M, the angle at which an off-axis light flux in a vertical direction is incident on the anamorphic lens system can be made small and the astigmatism of the off-axis image point can be made small.

Figure 3:
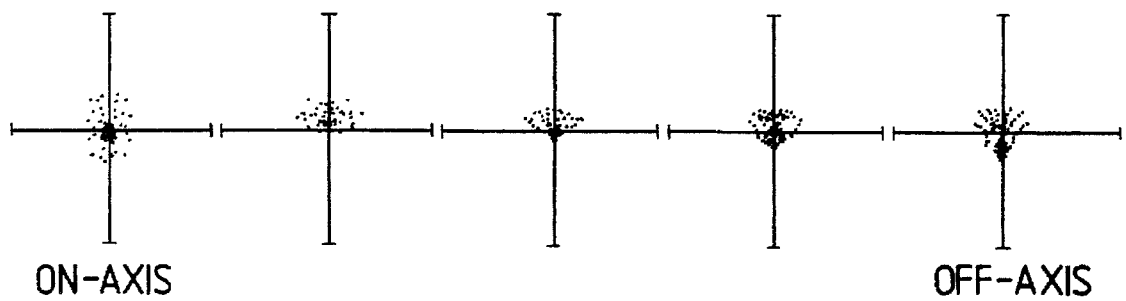
FIG. 3 is a spot diagram of numerical value embodiment 1 of the present invention.
Figure 4:
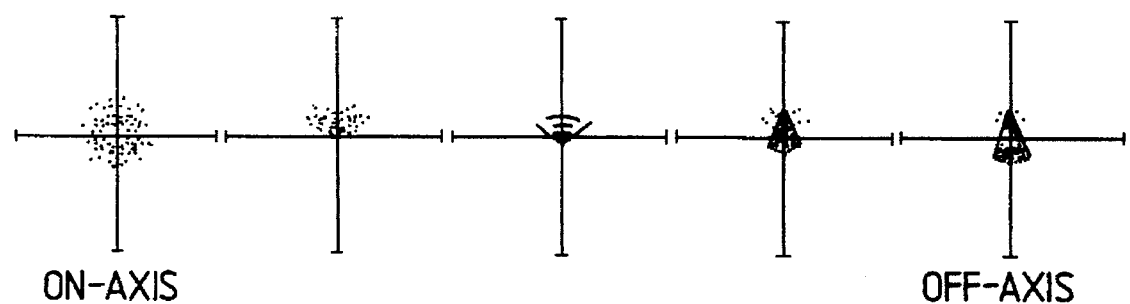
FIG. 4 is a spot diagram of numerical value embodiment 2 of the present invention.

FIGS. 3 and 4 are spot diagrams of the image point when the anamorphic lens system A is inclined by 4.5° so that the angle e it forms with respect to the optical axis of the master lens system M may be 9°. When on the basis of numerical value embodiments shown later, the off-axis principal ray in a vertical direction emerges at an emergence projection angle $\alpha$ of 18°, FIGS. 3 and 4 show the manner in which the expanse of the spot at the off-axis image point is corrected. By this, the resolution in a vertical direction is increased and a good imaged state can be brought about on the entire picture plane.

When the angle $\theta$ formed by the anamorphic lens system A with respect to the optical axis of the master lens system M and the emergence projection angle $\alpha$ of the projection apparatus in the vertical direction are in the relation that $(1/3)\cdot\alpha \leq \theta \leq (2/3)\cdot\alpha$, a greater effect is provided. If in this conditional expression, the angle $\theta$ is small beyond the lower limit, things will differ little from a case where the anamorphic lens system A is made parallel to the optical axis of the master lens system M and thus, the effect of the anamorphic lens system A being inclined will not appear. If the angle $\theta$ is great beyond the upper limit of the conditional expression, the angle at which the on-axis light flux is incident on the anamorphic lens system A will become great and the on-axis image point will become blurred.

Figure 5:
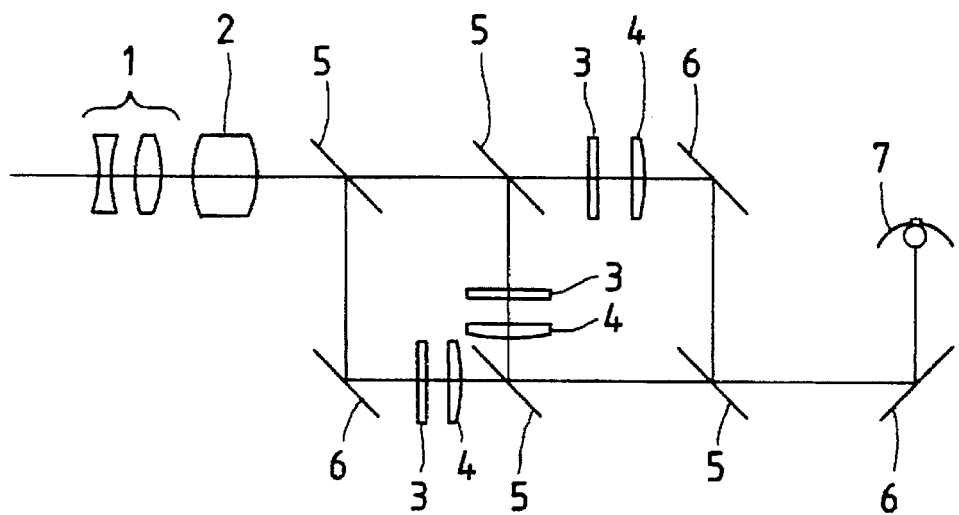
FIG. 5 schematically shows a first example of the construction of an enlarging projection apparatus.
Figure 6:
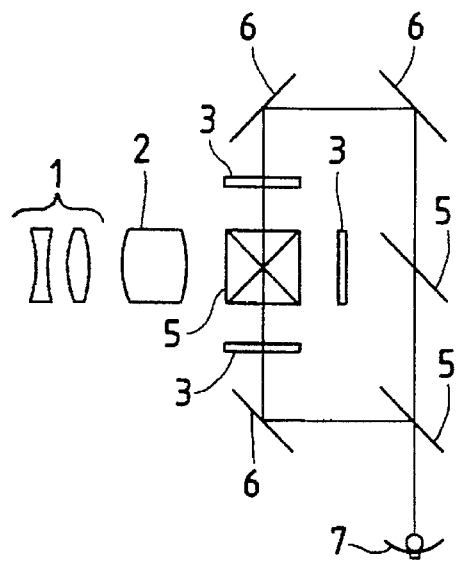
FIG. 6 schematically shows a second example of the construction of the enlarging projection apparatus.
Figure 7:
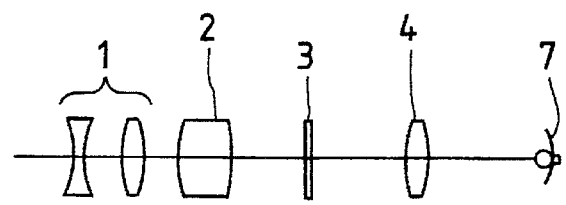
FIG. 7 schematically shows a third example of the construction of the enlarging projection apparatus.

FIGS. 5 to 7 schematically show examples of the optical arrangement of an enlarging projection apparatus applicable to the present invention. FIGS. 5 and 6 show a case where projected optical elements of three colors, R, G and B, are used as projected optical elements. The reference numeral 7 designates a white light source, the reference numeral 5 denotes color resolving (combining) optical elements which reflect a particular wavelength range of light, the reference numeral 3 designates projected optical elements producing red, green and blue images, respectively, and the reference numeral 4 denotes collimator lenses for efficiently condensing the light of the light source 7 on the projected optical elements 3. The reference numeral 6 designates reflecting optical elements which reflect light, the reference numeral 2 denotes a master lens system for projecting the projected optical elements, and the reference numeral 1 designates an anamorphic lens system according to the present invention. FIG. 7 shows a case where use is made of a colored projected optical element. The reference numeral 7 denotes a white light source, the reference numeral 3 designates a projected optical element which produces a color image, the reference numeral 4 denotes a collimator lens for efficiently condensing the light of the light source 7 on the projected optical element 3, the reference numeral 2 designates a master lens system for projecting the projected optical element, and the reference numeral 1 denotes an anamorphic lens system according to the present invention. Like this, various forms of the optical system from the master lens system 2 to the light source 7 are conceivable, and the present invention displays a sufficient effect in the cases of any optical systems.

Figure 8:
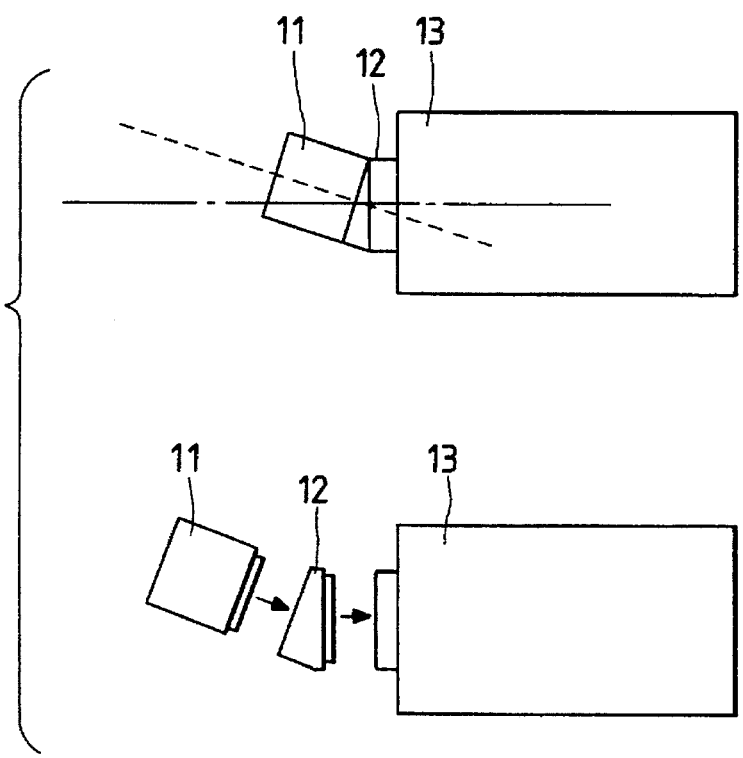
FIG. 8 shows an example of a construction for giving an angle to an anamorphic lens system.
Figure 9:
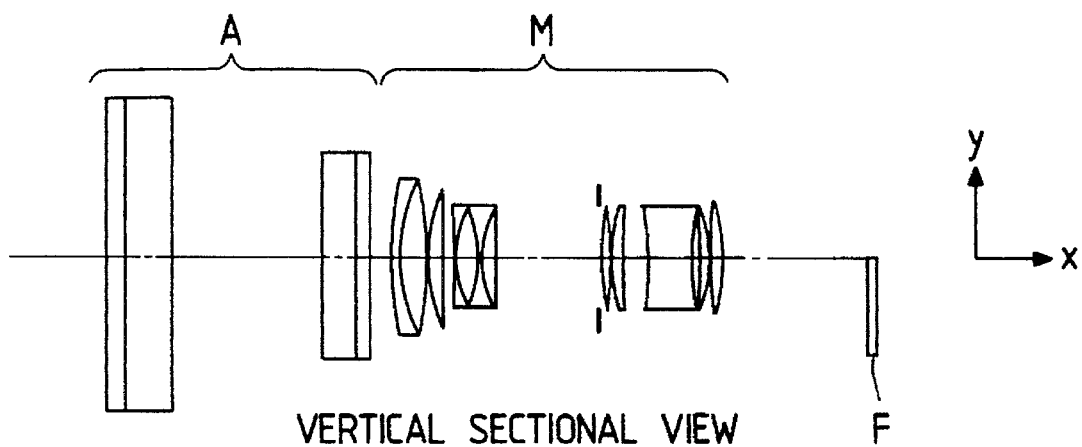
FIG. 9 is a vertical sectional view of the projection optical system of an apparatus according to the prior art.
Figure 10:
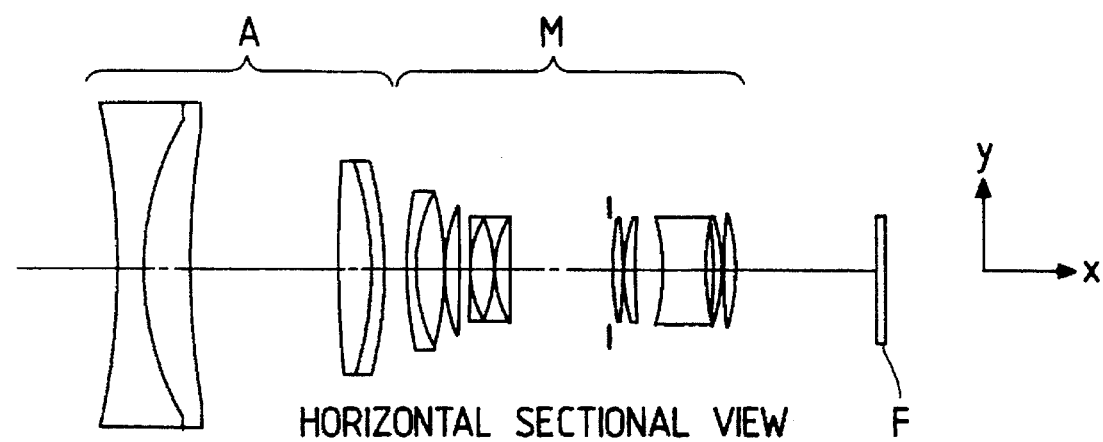
FIG. 10 is a horizontal sectional view of the projection optical system of the apparatus according to the prior art.
Figure 11:
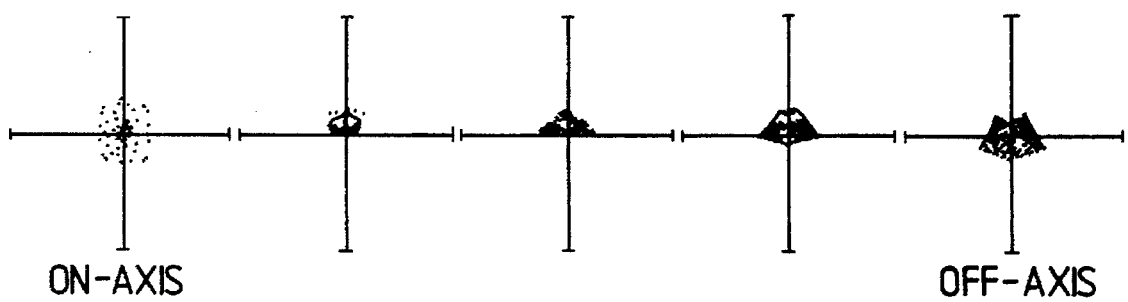
FIG. 11 is a spot diagram of the apparatus according to the prior art.

FIG. 8 shows an embodiment of angle giving means for giving a predetermined angle to the anamorphic lens system in the present invention with respect to the optical system of the master lens system. In FIG. 8, the reference numeral 11 designates a lens barrel including the anamorphic optical system, the reference numeral 13 denotes a projection apparatus including the master lens, and the reference numeral 12 designates an adapter having an opening which is fitted to the lens barrel of the master lens system, and an opening having a predetermined angle with respect to the opening and into which the lens barrel of the anamorphic lens system is fitted. The adapter 12 keeps the anamorphic lens system inclined with respect to the optical axis of the master lens system.

Numerical value embodiments of the present invention will be shown below. In the numerical value embodiments, Ri represents the radius of curvature of the ith lens surface from the object side, Di represents the thickness and air gap of the ith lens from the object side, and Ni and vi represent the refractive index and Abbe number, respectively, of the glass of the ith lens from the object side.

Numerical Value Embodiment 1
Anamorphic Lens System Anamorphic Ratio 0.75
Angle of inclination with respect to the
optical axis of the master lens 9°

| | | | |
|---|---|---|---|
| $Rz1 = -2.2089$ | $D1 = 0.0545$ | $N1 = 1.69979$ | $v1 = 55.5$ |
| $Rz2 = 0.8368$ | $D2 = 0.1417$ | $N2 = 1.72311$ | $v2 = 29.5$ |
| $Rz3 = 2.4136$ | $D3 = 0.4340$ | | |
| $Rz4 = 3.1327$ | $D4 = 0.1017$ | $N3 = 1.51825$ | $v3 = 64.1$ |
| $Rz5 = -0.9934$ | $D5 = 0.0327$ | $N4 = 1.81265$ | $v4 = 25.4$ |
| $Rz6 = -1.3974$ | | | |

Master Lens System
$F = 1 \quad FNO1: 5.7 \quad \omega = 0°—17.7°$

| | | | |
|---|---|---|---|
| $R7 = 1.2195$ | $D7 = 0.0247$ | $N5 = 1.81265$ | $v5 = 25.4$ |
| $R8 = 0.5937$ | $D8 = 0.0794$ | $N6 = 1.51825$ | $v6 = 64.1$ |
| $R9 = -1.4929$ | $D9 = 0.0015$ | | |
| $R10 = 0.5616$ | $D10 = 0.0448$ | $N7 = 1.51825$ | $v7 = 64.1$ |
| $R11 = 6.6781$ | $D11 = 0.0314$ | | |
| $R12 = 4.2353$ | $D12 = 0.0160$ | $N8 = 1.77621$ | $v8 = 49.6$ |
| $R13 = 0.4518$ | $D13 = 0.0488$ | | |
| $R14 = -0.5076$ | $D14 = 0.0160$ | $N9 = 1.77621$ | $v9 = 49.6$ |
| $R15 = 0.3485$ | $D15 = 0.0457$ | $N10 = 1.85501$ | $v10 = 23.9$ |
| $R16 = 6.3524$ | $D16 = 0.2932$ | | |
| $R17 = $ (Stop) | $D17 = 0.0073$ | | |
| $R18 = 1.6751$ | $D18 = 0.0215$ | $N11 = 1.69979$ | $v11 = 55.5$ |
| $R19 = -8.0010$ | $D19 = 0.0015$ | | |
| $R20 = 0.4665$ | $D20 = 0.0307$ | $N12 = 1.71615$ | $v12 = 53.8$ |
| $R21 = 1.3164$ | $D21 = 0.0817$ | | |
| $R22 = -0.7268$ | $D22 = 0.1169$ | $N13 = 1.73429$ | $v13 = 28.5$ |
| $R23 = 0.7269$ | $D23 = 0.0191$ | | |
| $R24 = -585.5295$ | $D24 = 0.0304$ | $N14 = 1.71615$ | $v14 = 53.8$ |
| $R25 = -0.7369$ | $D25 = 0.0015$ | | |
| $R26 = 1.8553$ | $D26 = 0.0377$ | $N15 = 1.71615$ | $v15 = 53.8$ |
| $R27 = -0.9421$ | | | |

($D_3$ and $D_{10}$ vary in accordance with focusing state.)

Numerical Value Embodiment 2
Anamorphic Lens System Anamorphic Ratio 0.71
Angle of inclination with respect to the
optical axis of the master lens 4.5°

| | | | |
|---|---|---|---|
| $Rz1 = -2.8407$ | $D1 = 0.0727$ | $N1 = 1.64129$ | $v1 = 55.4$ |
| $Rz2 = 1.5869$ | $D2 = 0.6078$ | | |
| $Rz3 = 2.6510$ | $D3 = 0.0727$ | $N2 = 1.52032$ | $v2 = 59.0$ |
| $Rz4 = -2.0414$ | | | |

($D_2$ varies in accordance with focusing state.)

Figure 12:
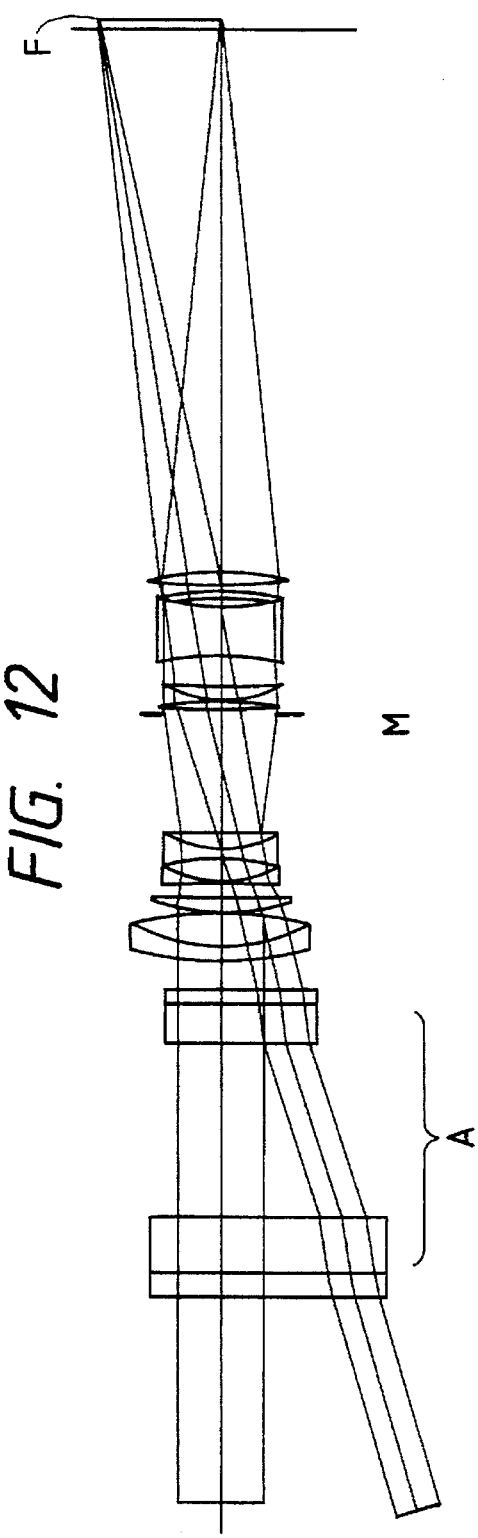
FIG. 12 is an optical sectional view in which an anamorphic lens is shifted relative to the optical axis of a master lens.

FIG. 12 shows an embodiment of the projection apparatus in which the projected image element F is shifted relative to the optical axis of the master lens M and wherein the center of the opening in the anamorphic lens is shifted relative to the optical axis of the master lens and the anamorphic lens is disposed so as to cut a portion through which an effective light flux does not pass, and in this embodiment, the anamorphic lens system is made much more compact than in a case where the center of the opening in the anamorphic lens system and the optical axis of the master lens are coaxial with each other.

Figure 13:
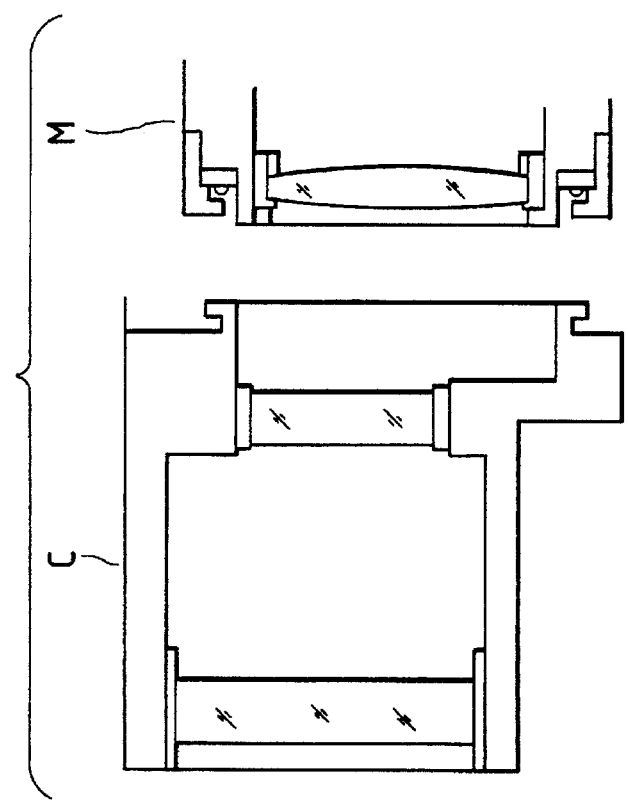
FIG. 13 is a cross-sectional view of the anamorphic lens system as it is shifted relative to the master lens.

FIG. 13 shows the cross-sectional shape of an anamorphic converter in which the anamorphic lens is disposed with the center of the opening therein shifted relative to the optical axis of the master lens shown in FIG. 12, and the joint portions between the converter C and the metallic material M of the master lens are of conventional mount structure in which they can be coupled together and are fixed at a predetermined position. The anamorphic lens converter has a forward opening formed with a shift relative to the opening in the joint portion (rear portion), and the anamorphic lens is disposed therein.

Figure 14:
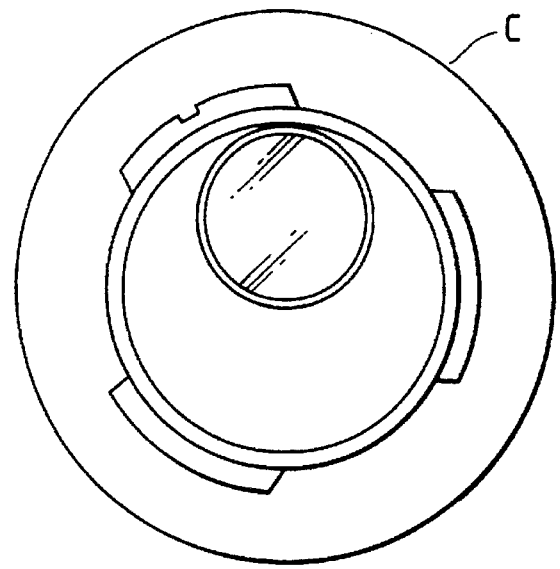
FIG. 14 is a view of the anamorphic lens system in FIG. 13 as it is seen from the rear thereof.

FIG. 14 is a view of the converter in FIG. 13 as it is seen from the master lens side.

Figure 15:
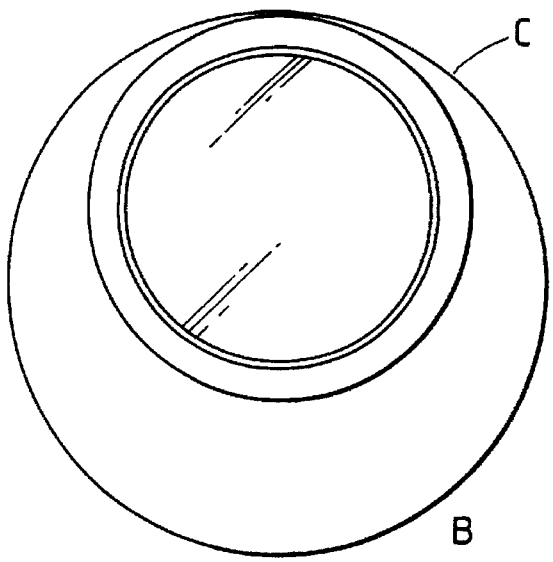
FIG. 15 is a view of the anamorphic lens system in FIG. 13 as it is seen from the front thereof.

FIG. 15 is a view of the converter in FIG. 13 as it is seen from the opposite side (the front) of the master lens.

Figure 16:
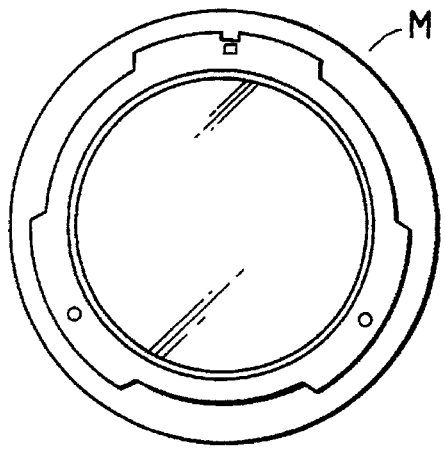
FIG. 16 is a view of the master lens in FIG. 13 as it is seen from the front thereof.

FIG. 16 is a view of the joint portion of the master lens in FIG. 13 as it is seen from the converter side.

Figure 17:
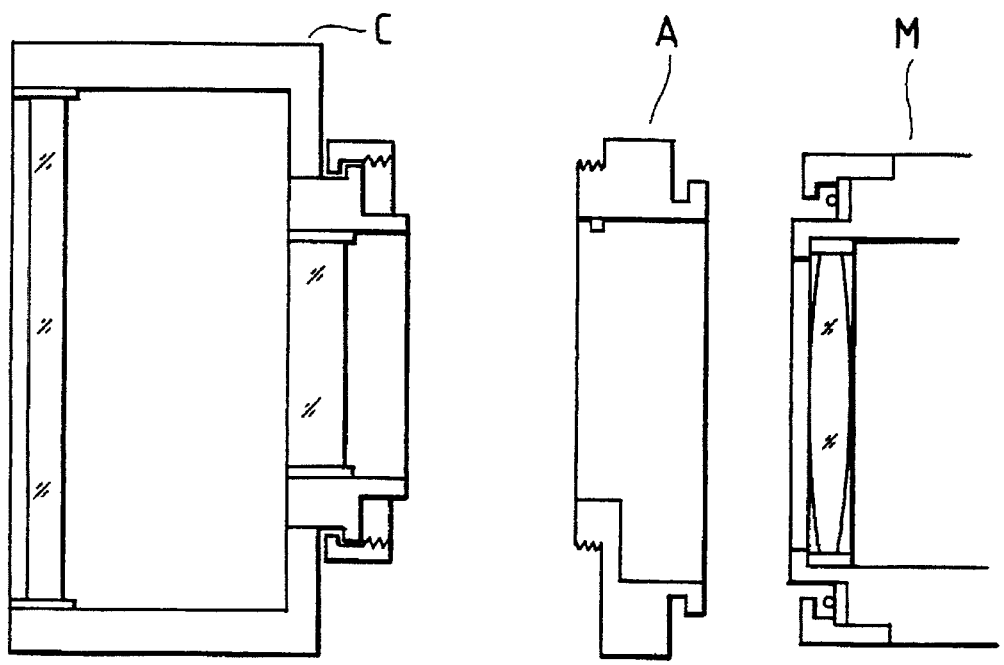
FIG. 17 is a cross-sectional view of an adapter, an anamorphic lens system and a master lens system according to the present invention.

FIG. 17 shows a cross-sectional view of an adapter A according to another embodiment for mounting the anamorphic converter C on the metallic material M of the master lens with a shift relative to the latter. The joint portion of the adapter A with the metallic material M of the master lens is a mount insertable only in a predetermined direction and fixed at a predetermined position as in FIG. 13, and that side (front) of the adapter, which is opposite to the joint portion with the master lens, has an opening which shifts relative to the center of the opening in the joint portion with the master lens and provides the joint portion with the anamorphic converter C. The joint portion with the anamorphic converter has a pin provided on that side thereof which is adjacent to the adapter, and a slit corresponding to the pin is provided in the converter side and is set to a predetermined position, and is fixed at that position by a rotational threaded ring.

Figure 18:
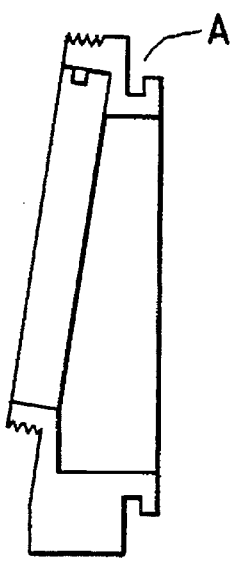
FIG. 18 shows an adapter for inlining.

FIG. 18 is a cross-sectional view of an adapter for endowing the anamorphic lens with a predetermined angle with respect to the optical axis of the master lens, and the joint surface thereof with the metallic material of the master lens and the joint surface thereof with the converter each have a predetermined angle. The structure of each of the joint portion is the same as that shown in FIG. 17.

By the projection optical system as described above, a projected image of high resolution and wide aspect ratio can be realized even in an enlarging projection apparatus wherein a projected image element is disposed while being vertically shifted relative to the optical axis of a master lens.

A description will hereinafter be made of an embodiment in which the angular adjustment of the anamorphic lens is effected in conformity with zooming or the movement of the projected image element with respect to the vertical direction.

Figure 19A:
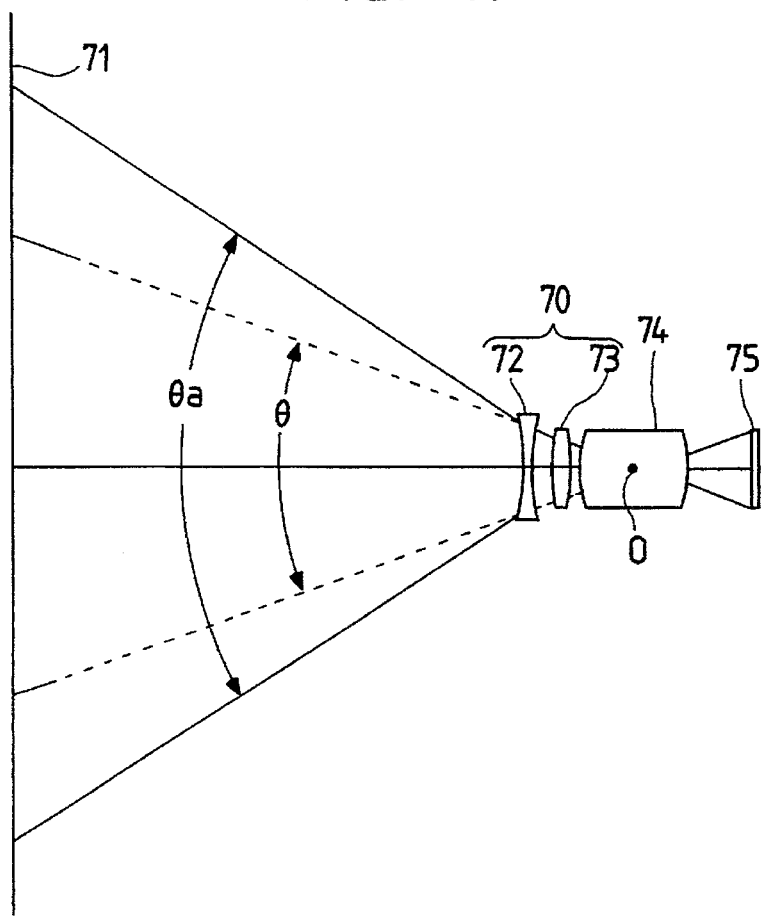
FIGS. 19A and 19B are schematic views of the essential portions of an embodiment of the present invention.
Figure 19B:
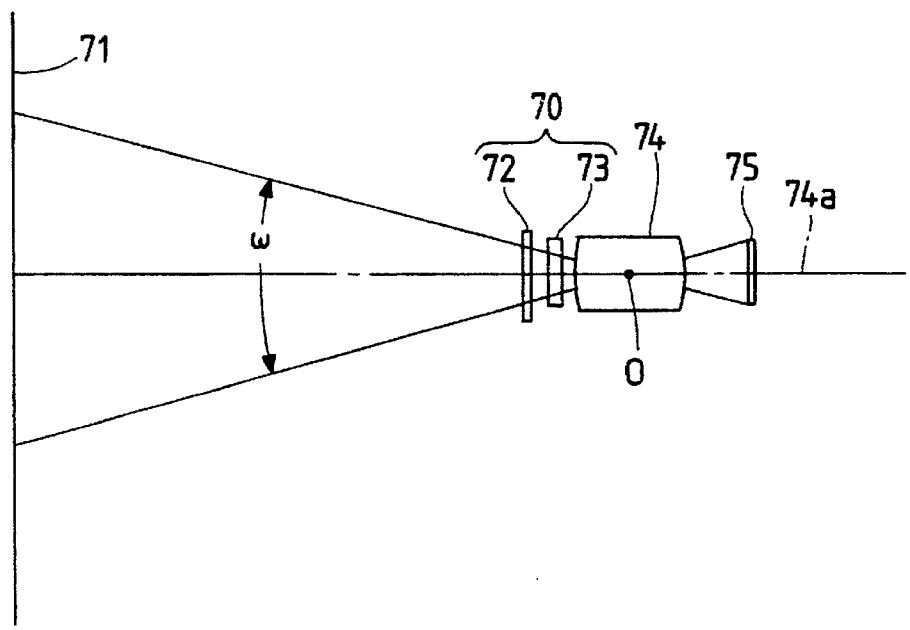

FIGS. 19A and 19B are schematic views of the essential portions of the horizontal cross-section and the vertical cross-section, respectively, of an optical system according to another embodiment of the present invention.

In FIG. 19, the reference numeral 71 designates a screen, and the reference numeral 70 denotes an anamorphic system comprising a negative cylindrical lens unit 72 and a positive cylindrical lens unit 73 having refractive power only in a horizontal direction. The reference numeral 74 designates a projection system (a master lens) which enlarges and projects a projection image 75 onto the surface of the screen 71. The anamorphic system 70 is vertically rotatable about a point 0 on the optical axis 74a of the projection system 74. The reference numeral 75 denotes a projection image (a projected optical element) on which image information is compressed and recorded in a horizontal direction. The projection image is shifted in a vertical direction with respect to the optical axis 74a of the projection system 74 and fixed.

Figure 20:
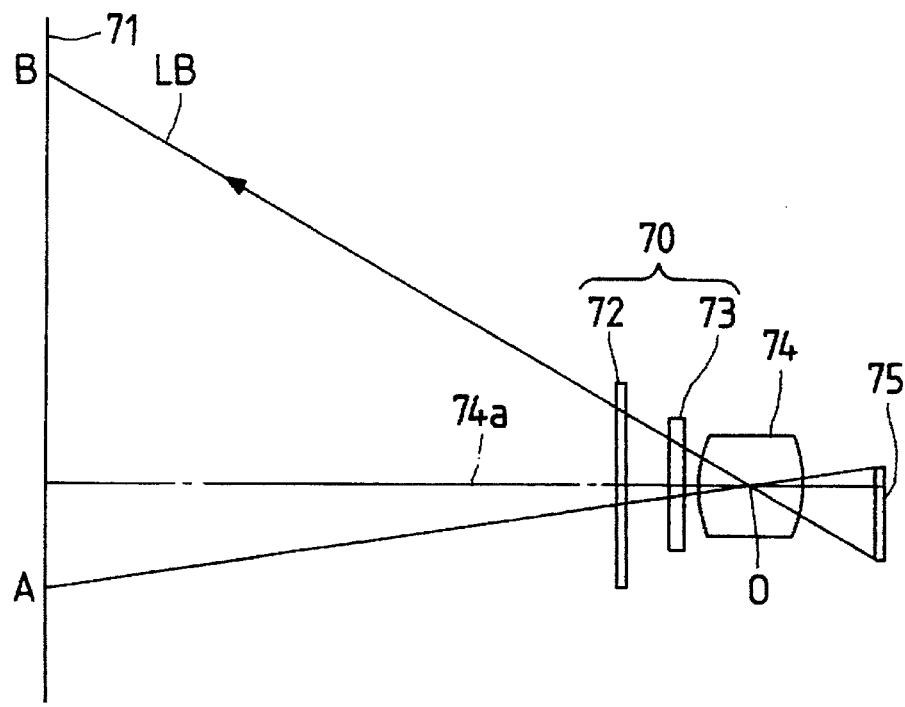
FIG. 20 is a schematic view of the essential portions when a portion of FIG. 19 is magnification-changed.

In FIG. 19A, there is shown a state in which the anamorphic system 70 is mounted, whereby the angle of projection is enlarged from an angle θ to an angle θa only in a horizontal direction. The angle of projection in the vertical direction of FIG. 19B is ω. FIG. 20 shows a vertical cross-section when in the embodiment of FIG. 19B, the projection image 75 is shifted by a predetermined amount in a direction perpendicular to the optical axis 74a of the projection system 74.

Figure 22:
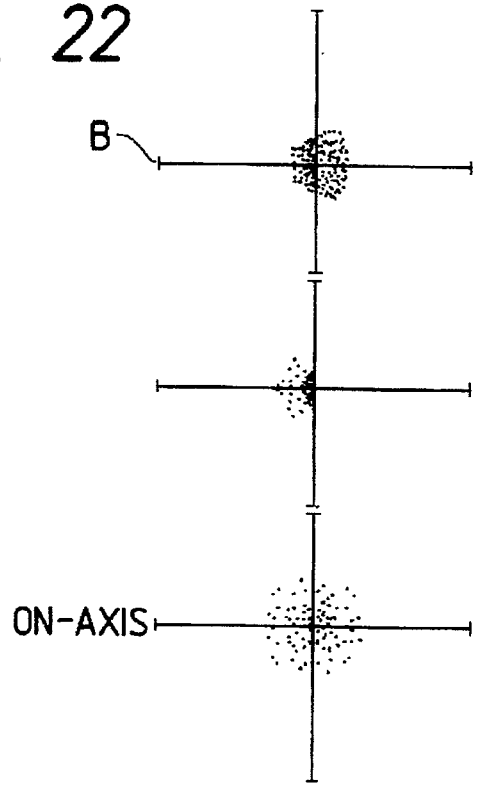
FIG. 22 is a spot diagram showing astigmatism at an off-axis point B in FIG. 20.

Generally, in the optical arrangement as shown in FIG. 20, a light flux LB in a direction B having a great angle of emergence in a vertical direction is incident on the anamorphic system 70 at a great angle. Therefore, as shown in the spot diagram of FIG. 22, astigmatism is much created and the projected image becomes deteriorated.

Figure 21:
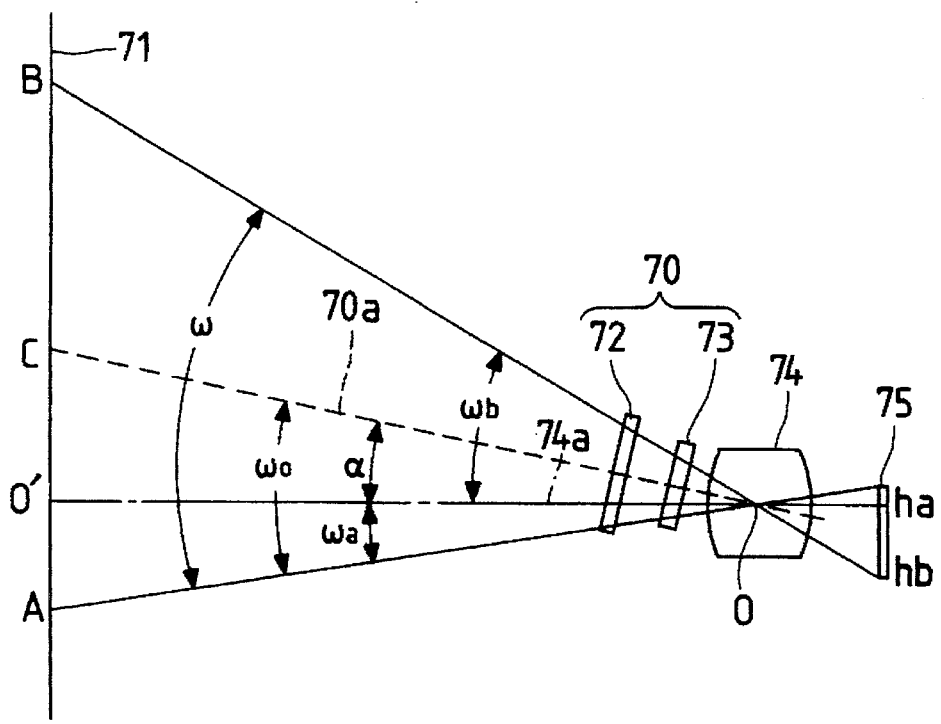
FIG. 21 is a schematic view of the essential portions when a portion of FIG. 19 is magnification-changed.
Figure 23:
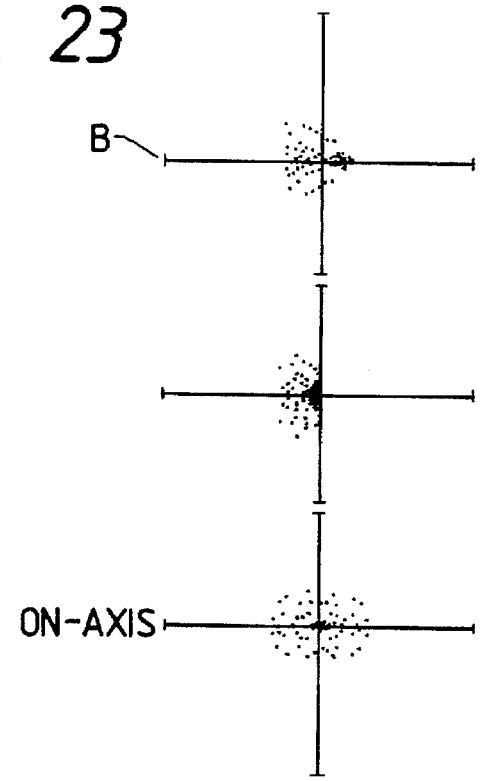
FIG. 23 is a spot diagram showing astigmatism at the off-axis point B in FIG. 21.

FIG. 21 shows a state in which in order to prevent the then deterioration of the optical performance, the anamorphic system 70 has been inclined from the state of FIG. 20 by an angle α about the point 0 with respect to the projection system 74. The reference character 70a designates the optical axis of the anamorphic system 70. FIG. 23 is a spot diagram showing a state in which astigmatism has been well corrected.

In the construction shown in FIG. 21, when the focal length of the projection system 74 is f and of the dimensions of the projection image 75, the vertical heights thereof above and below the optical axis 74a are ha and hb, respectively, the angle of emergence ω of the projection apparatus is $$\angle AOB = \omega = \omega a + \omega b$$

where $$\angle AOO' = \omega a = |\tan(ha/f)|$$

$$\angle BOO' = \omega b = |\tan(hb/f)|$$

Also, the angle $\omega_0$ formed between a deviation orthogonal to the anamorphic system 70 and a direction in which the angle of emergence is smaller is $$\angle COA = \omega_0 = \omega a + \alpha.$$

In the present embodiment, when the anamorphic system 70 is given an angle α with respect to the optical axis 74a of the projection system 74, $$\omega/3 \leq \omega_0 \leq 2\omega/3.$$

Thereby, the optical effect when the anamorphic system is inclined is obtained. Further, the angle $\omega_0$ is substantially equal to ω/2, and is set, for example, to $$2\omega/5 \leq \omega_0 \leq 3\omega/5,$$

whereby there is provided a state in which the best optical performance is obtained.

In the present embodiment, the focal length f of the projection system 74 and the vertical heights ha and hb of the projection image 75 relative to the optical axis are changed depending on the specification of the projection apparatus. That is, design is made such that the angle of the anamorphic system 70, which realizes the best state with respect to the optical axis of the projection system 74, can be arbitrarily adjusted by angle setting means (not shown), depending on the specification of the projection system 74.

Even if the projection image is made movable and the angle of projection is variously changed, the present invention is equally applicable.

Figure 24:
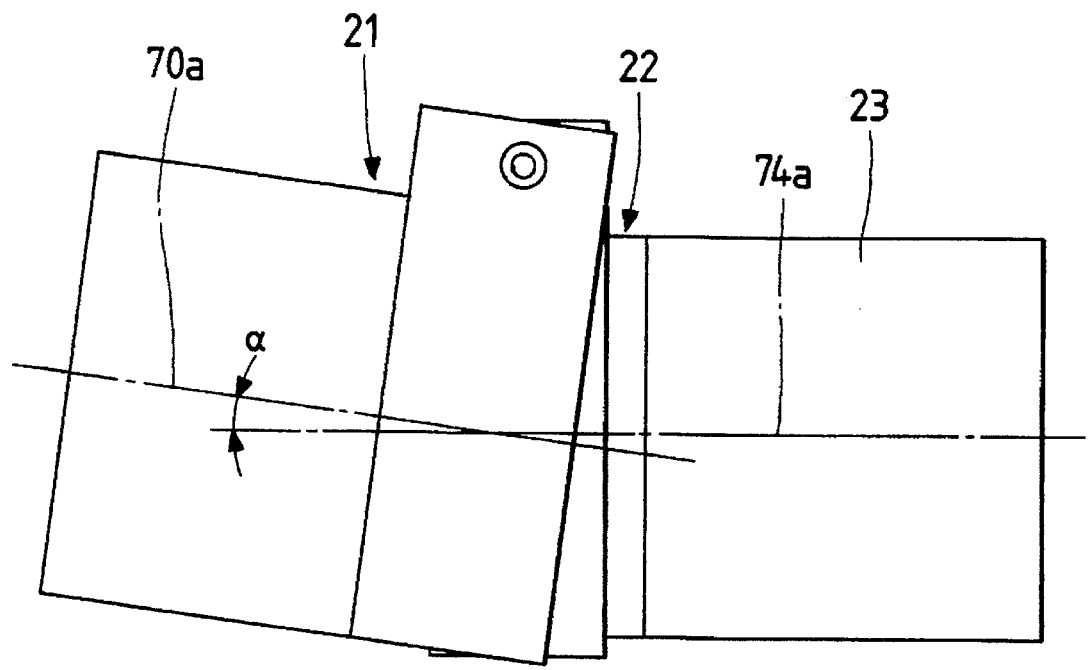
FIG. 24 is a pictorial view of the essential portions of a first embodiment of the present invention.
Figure 25:
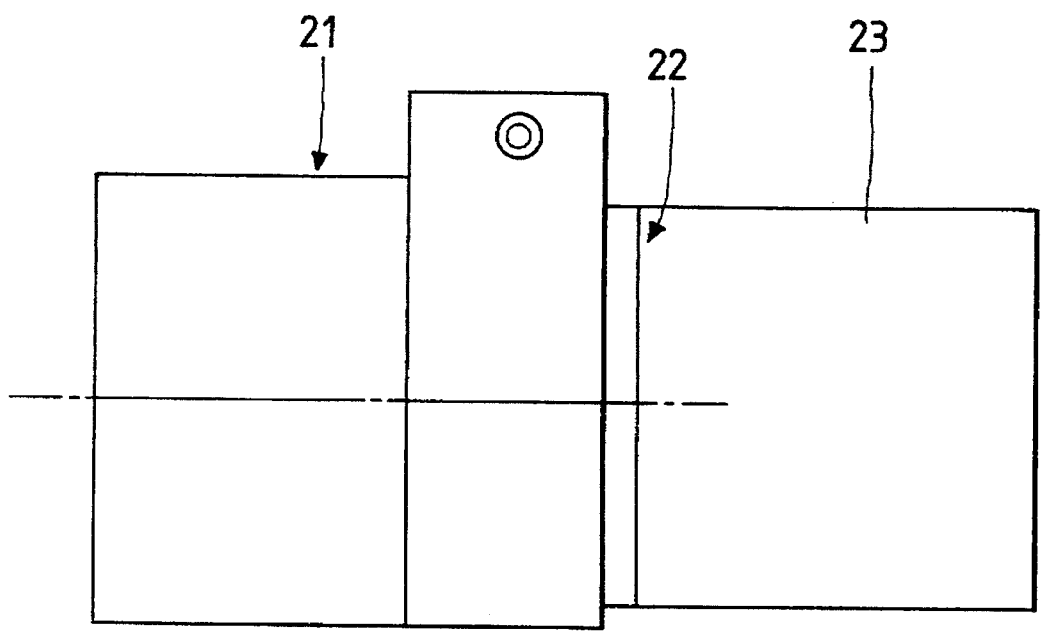
FIG. 25 is a pictorial view of the essential portions of the first embodiment of the present invention.

FIGS. 24 and 25 are schematic views of the essential portions of the lens barrel when the anamorphic system is inclined by the angle setting means.

In these figures, the reference numeral 21 designates an anamorphic barrel base, the reference numeral 23 denotes a projection system barrel base, and the reference numeral 22 designates a connecting base which connects the anamorphic barrel base 21 and the projection system barrel base 23 together.

FIGS. 24 and 25 show a case where the anamorphic system 70 is given the angle α with respect to the optical axis 74a of the projection system 74 by the angle setting means and a case where the anamorphic system 70 is given no angle, respectively.

The angle setting means according to the present invention will now be described with reference to FIGS. 26 and 27.

FIGS. 26A, 26B and 26C are a front view, a left side view and a right side view, respectively, of the anamorphic barrel base 21. In these figures, the reference numeral 11 designates an anamorphic barrel, and the reference numeral 12 denotes a coupling aperture for coupling with the connecting base 22.

Figure 27C:
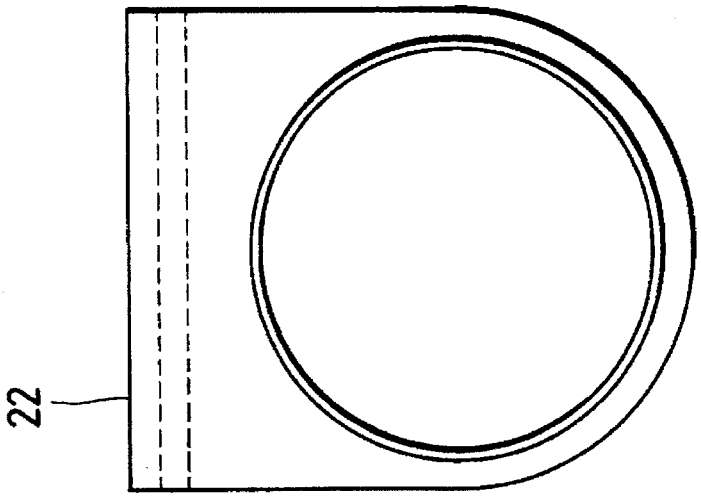
FIGS. 27A to 27C illustrate angle setting means in the first embodiment of the present invention.
Figure 27B:
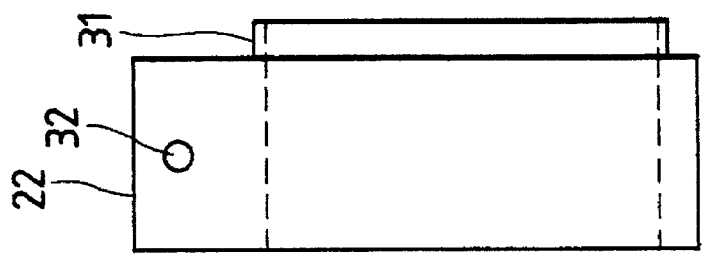
Figure 27A:
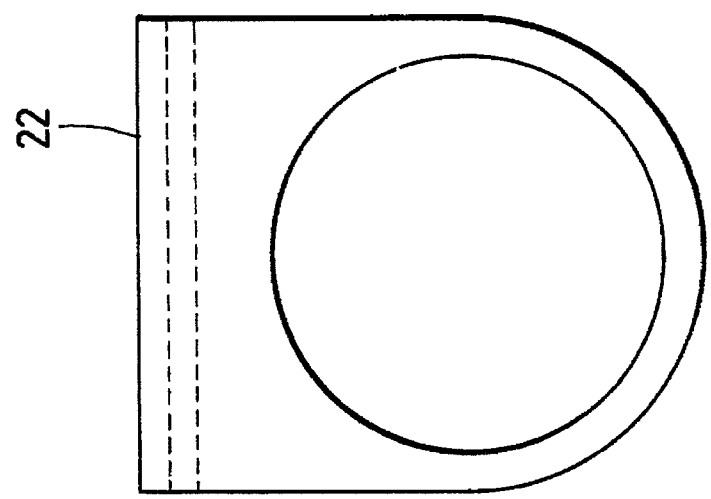

FIGS. 27A, 27B and 27C are a front view, a left side view and a right side view, respectively, of the connecting base 22. In these figures, the reference numeral 32 designates a coupling aperture for coupling with the anamorphic barrel base 21, and the reference numeral 31 denotes a base body fixed at a predetermined location which is a coupling portion for coupling with the projection system barrel base 23.

The anamorphic barrel base 21 and the connecting base 22 are fixed by pins inserted in the coupling apertures 12 and 22 and contain spring-like members (not shown) therein, and are designed such that after predetermined pressure is applied to the coupling portion and the anamorphic barrel 11 is set to a certain angle, the angle is not varied by the gravity of the anamorphic barrel.

Figure 28A:
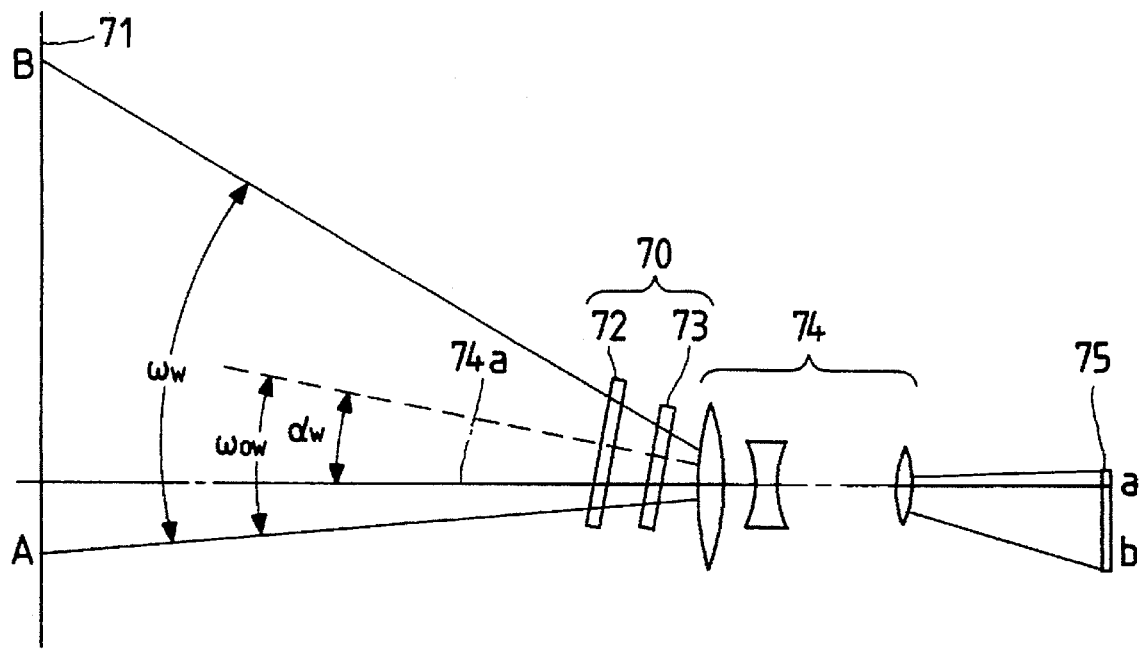
FIGS. 28A and 28B are schematic views of the essential portions of a second embodiment of the present invention.
Figure 28B:
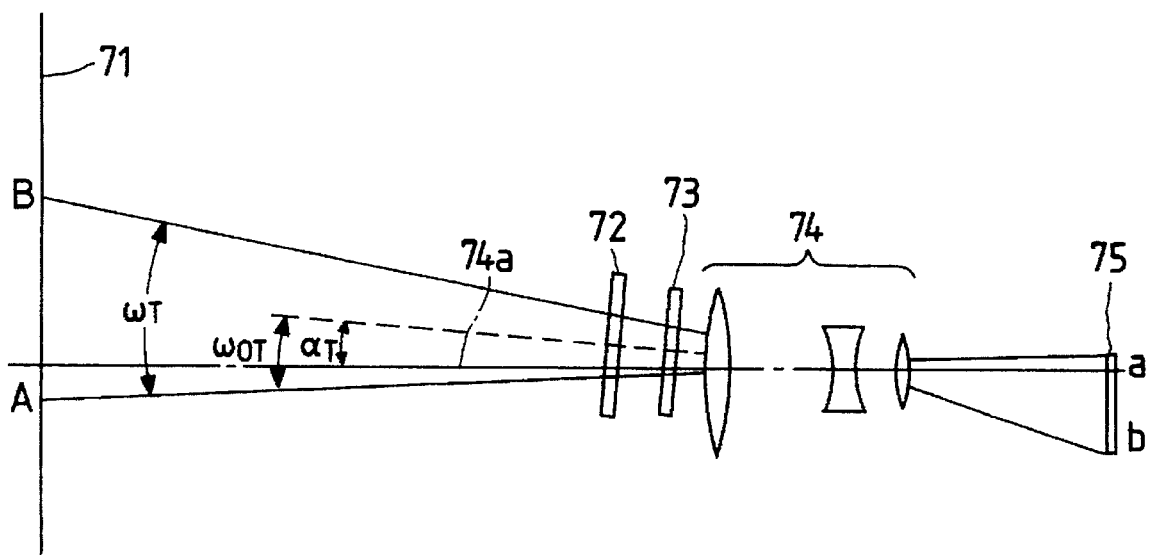

FIGS. 28A and 28B are schematic views of the essential portions of the vertical cross-section of an optical system according to a further embodiment of the present invention. This embodiment differs from the embodiment shown in FIG. 19 in that the projection system 74 is comprised of a zoom lens having a magnification changing portion and by angle setting means, the anamorphic system is automatically inclined by a predetermined angle with respect to the optical axis 74a of the projection system 74 in conformity with the zooming (magnification change) of the magnification changing portion, and in the other points, this embodiment is substantially the same as the embodiment shown in FIG. 19.

FIG. 28A shows a state in which the projection system 74 is positioned at the wide angle end, and FIG. 28B shows a state in which the projection system 74 is positioned at the telephoto end.

In the present embodiment, the projection system 74 is changed from a focal length fw to a focal length ft by zooming (magnification change). With the magnification change, the angle of projection is changed from an angle ωw to an angle ωt. At this time, as in the aforementioned conditional expression, the anamorphic system is given an angle α with respect to the optical axis 74a of the projection system 74 by the angle setting means, whereby the best projection state is obtained. That is, the angle as shown in FIG. 28 is set, at the wide angle end, as $2\omega w/5 \leq \omega_{0w} \leq 3\omega w/5$ and at the telephoto end, as $2\omega t/5 \leq \omega_{0t} \leq 3\omega t/5$.

Figure 29:
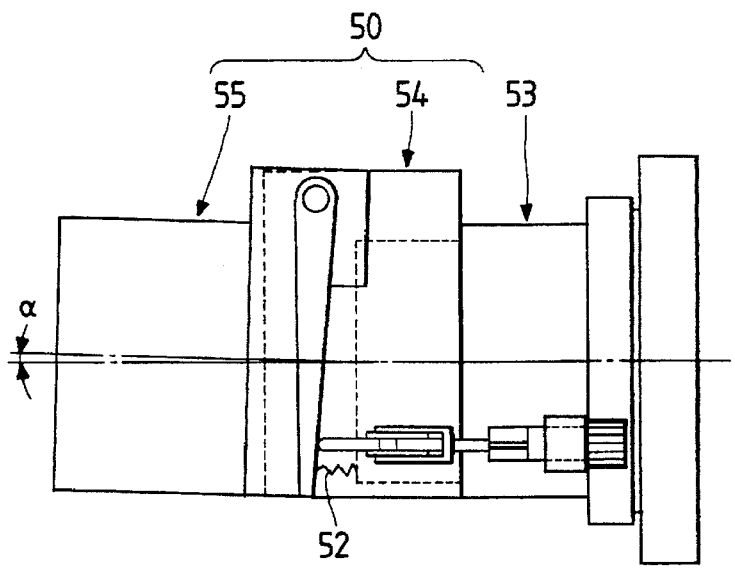
FIG. 29 is a pictorial view of the essential portions of the second embodiment of the present invention.
Figure 30:
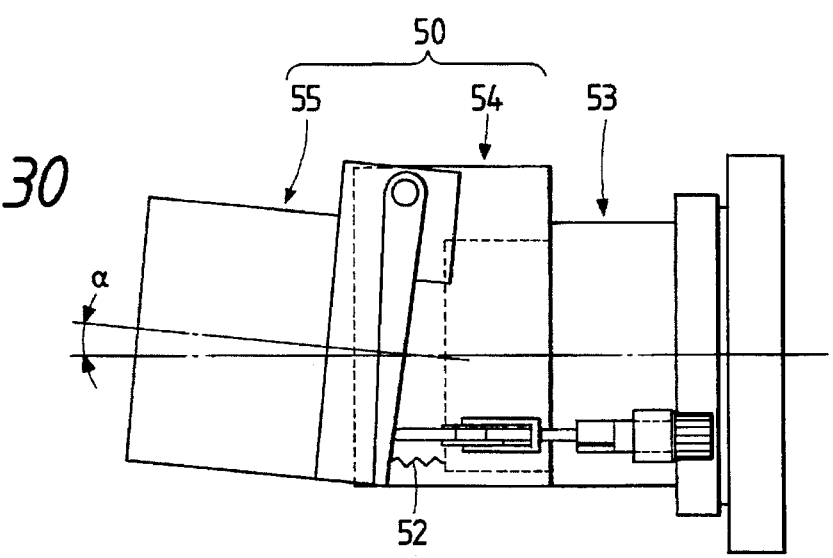
FIG. 30 is a pictorial view of the essential portions of the second embodiment of the present invention.

FIGS. 29 and 30 illustrate the projection system at the telephoto end and the wide angle end, respectively, when the anamorphic system is inclined by a predetermined angle with respect to the projection system by the angle setting means in the present embodiment.

FIG. 29 corresponds to FIG. 28B, and FIG. 30 corresponds to FIG. 28A. In FIGS. 29 and 30, the reference numeral 53 designates a projection system barrel base, the reference numeral 54 denotes a connecting base including a rotation-rectilinear movement connecting mechanism, and the reference numeral 55 designates an anamorphic barrel base.

Figure 31:
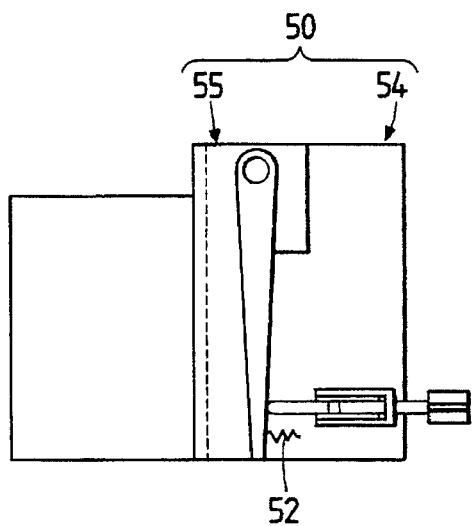
FIG. 31 illustrates angle setting means in the second embodiment of the present invention.
Figure 32:
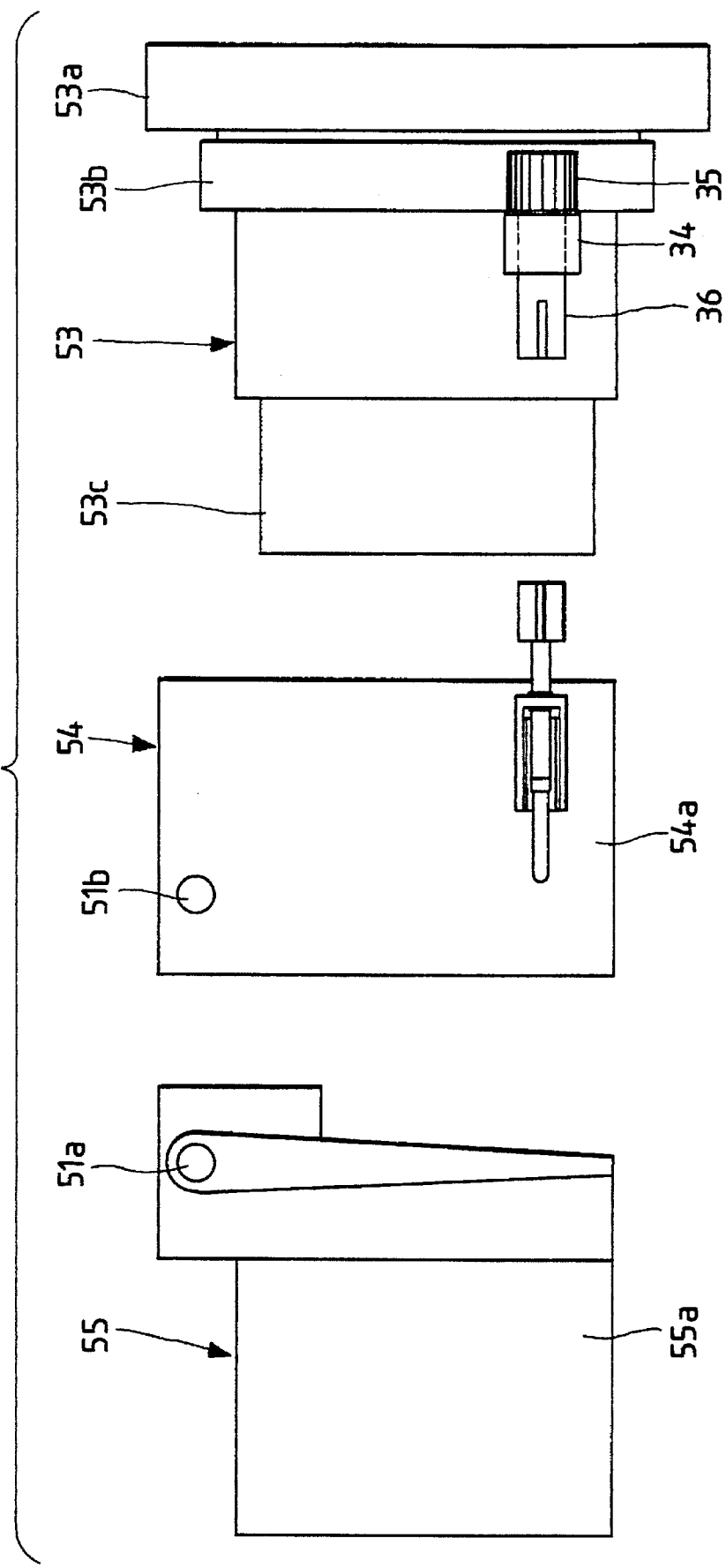
FIG. 32 illustrates angle setting means in the second embodiment of the present invention.
Figure 33:
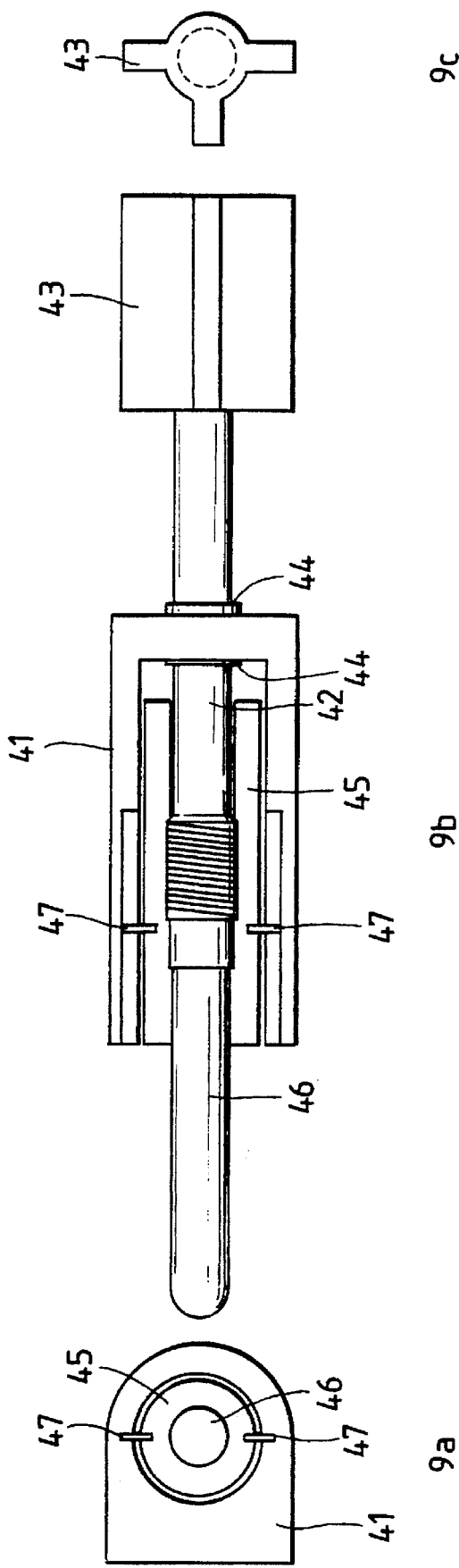
FIG. 33 illustrates angle setting means in the second embodiment of the present invention.

The construction of the angle setting means in the present embodiment will now be described with reference to FIGS. 31, 32 and 33.

In these figures, the reference character 53a denotes a zoom dial provided on the projection system barrel. The reference character 53b designates a zoom ring gear made integral with the zoom dial 53a. The reference character 53c denotes a projection system connecting portion, the reference numeral 34 designates a transmission pin holding portion, and the reference numeral 35 denotes a zoom transmission gear which is in mesh engagement with the zoom ring gear 53b. The reference numeral 36 designates a transmission pin connecting member, the reference character 54a denotes a rotation-rectilinear movement converting mechanism holding portion, the reference numeral 42 designates a male screw, the reference numeral 43 denotes a male screw connecting portion, and the reference numeral 44 designates a male screw slip-out preventing means designed to be rotated by the male screw 42. The reference numeral 45 denotes a female screw, the reference numeral 46 designates a rectilinearly movable pin, and the reference numeral 47 denotes female screw stoppers which limit the direction of rotation of the female screw 45. The reference characters 51b and 51a designate converter connecting apertures, and the reference character 55a denotes an anamorphic barrel including a rectilinearly movable pin contacting portion. The reference numeral 52 designates an operational spring having a biasing force in a direction in which it contracts.

A connecting base 54 and an anamorphic barrel base 55 are rotatably connected together in the converter connecting apertures 51a and 51b by pins and the portions thereof, which are opposite to the converter connecting apertures 51b and 51a, are connected together by the operational spring 52 which is designed to pull at all times, whereby an anamorphic converter 50 is formed. When the anamorphic converter 50 is to be incorporated into an apparatus body including the projection system, the transmission pin connecting member 36 and the male screw connecting member 43 are preset at locations where they just fit to each other, whereafter the anamorphic converter 50 is straightly fitted into the connecting portion of the projection system and the anamorphic converter 50 is fixed by a connection fixing mechanism (not shown).

The operation of this angle setting means will now be described.

When the zoom dial 53a is rotated to zoom the projection system, the zoom ring gear 53b integral with the zoom dial 53a is rotated and further, the zoom transmission gear 35, which is in mesh engagement with the zoom ring gear 53b, is rotated. This rotation is transmitted through a connecting member comprising the transmission pin connecting member 36 and the male screw connecting member 43, and the male screw 42 is rotated in a predetermined position by the male screw slip-out preventing means 44.

The female screw 45 is limited in the direction of rotation by the female screw stoppers 47 and therefore, by the rotation of the male screw 42, the female screw 45 is rectilinearly moved in a direction in which the screw comes out or a direction in which the screw comes in, and the rectilinearly movable pin 46, which is fixed to the female screw 45, is rectilinearly moved.

The portion of contact of the rectilinearly movable pin 46 is always urged against the rectilinearly movable pin 46 by the operational spring 52 and therefore, in response to the movement of the rectilinearly movable pin 46, the anamorphic barrel 55a rotates about the converter joint portions 51a, 51b and thus, the anamorphic system can be given a predetermined anglewith respect to the optical axis of the projection system.

If the gear pitch of the zoom ring gear 53b is changed in accordance with the specification of the projection system 143, it will become possible to mount an anamorphic converter on many projection apparatuses.

Also, in this embodiment, mechanical operative association is adopted, but it is also possible to mount an encoder and a motor on the zoom ring gear 53a and the male screw, respectively, detect the angle of rotation of the zoom ring gear by the encoder and electrically control the motor so as to rotate by an amount corresponding to the angle of rotation.

Figure 34:
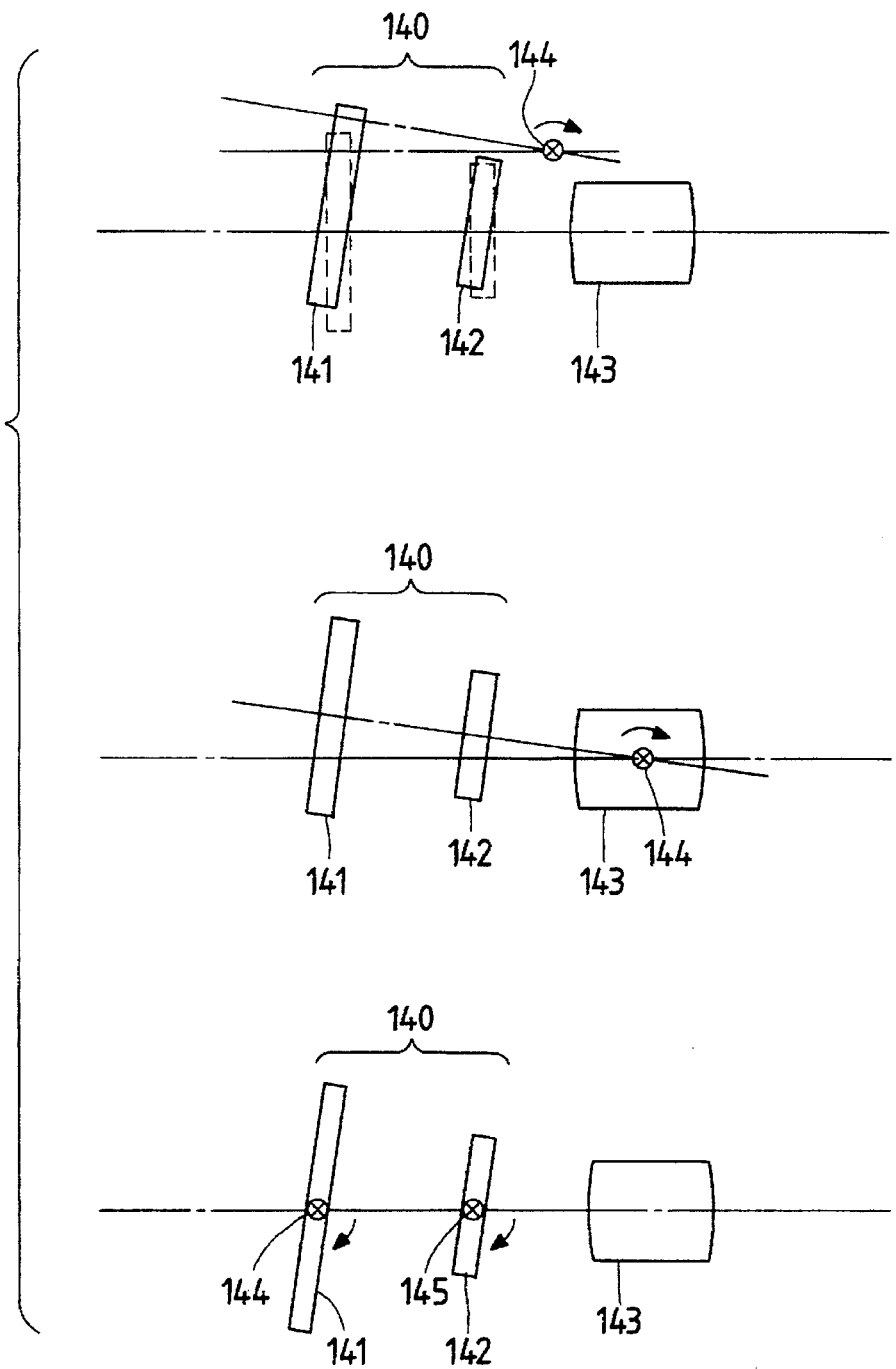
FIG. 34 schematically shows the essential portions when the axis of rotation of an anamorphic system according to the present invention is changed.

In the present embodiment, the rotational axis of the anamorphic converter 50 is disposed above the connecting portion between the anamorphic system and the projection system, but since the anamorphic system is a cylindrical surface, as shown in FIG. 34, the cylindrical lenses 141 and 142 of the anamorphic system 140 may be inclined about horizontal rotational axes 144 and 145, respectively, perpendicular to the direction of at least one optical axis.

According to the present invention, as previously described, an image, compressed and recorded in a horizontal direction, is used as a projection image and when the image is projected upwardly while being laterally enlarged on the surface of a screen, the relative optical position of the anamorphic system and the projection system is set so that it can be arbitrarily adjusted in conformity with the specification of the projection system, whereby there can be achieved a projection apparatus having an anamorphic system in which the fluctuation of aberrations therethrough is small and which can project the image with a good optical performance over the entire picture plane.

In the foregoing embodiments, description has been made from the viewpoint of astigmatism, and hereinafter an embodiment of the present invention will be described from the viewpoint of the distortion of image.

Figure 35:
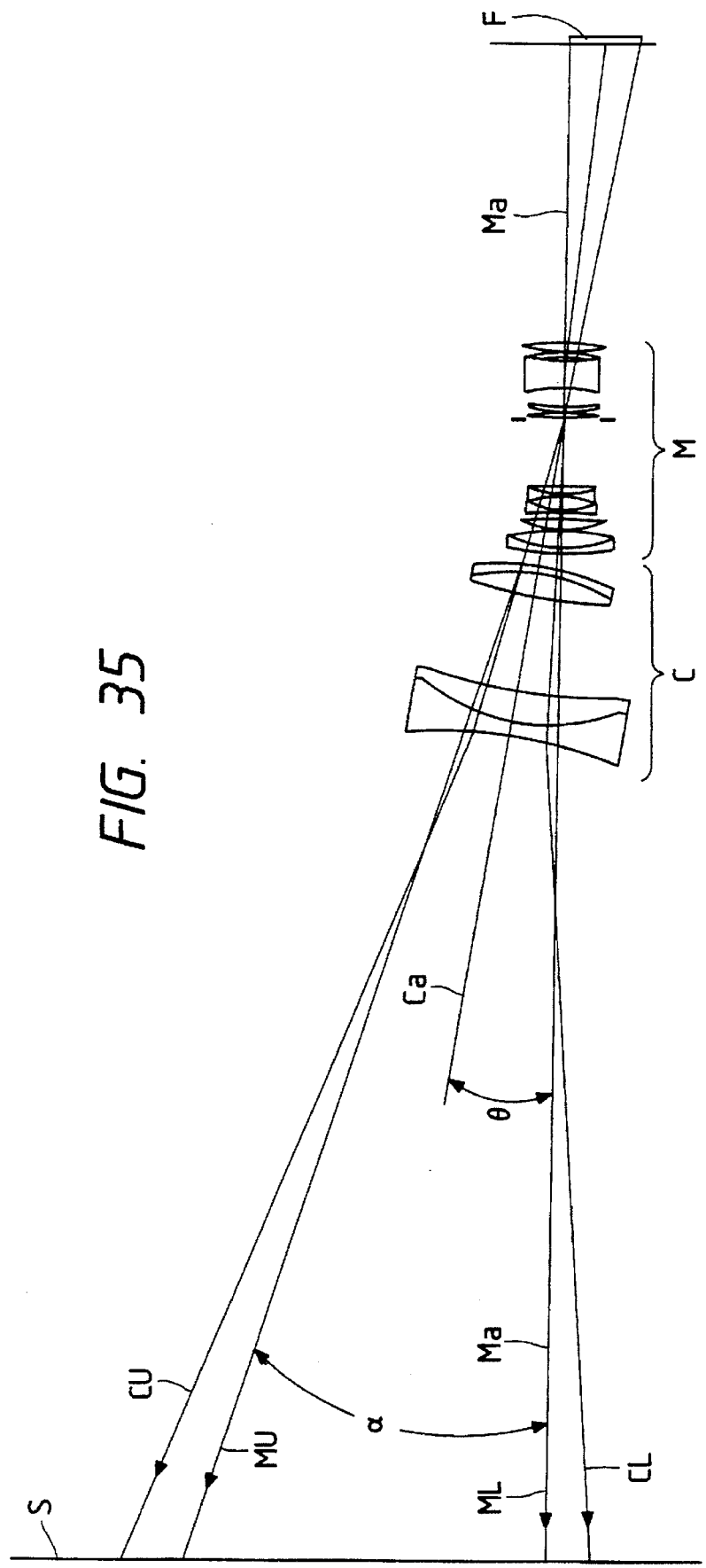
FIG. 35 is a schematic view of the essential portions of an additional optical system and a projection system according to the present invention.

FIG. 35 is a schematic view of the essential portions of an embodiment showing the optical arrangement of a projection system and an additional optical system according to the present invention. In FIG. 35, the letter S designates a screen, the letter M denotes a projection system (a main optical system) having positive refractive power, and the letter C designates an additional optical system comprising a wide converter, a teleconverter or an anamorphic optical system and disposed forwardly of the projection system M at a predetermined angle with respect to the optical axis Ma of the projection system M.

The letter F denotes a projection image comprising a photographed image or an image comprising a liquid crystal display element and disposed with a vertical (downward) shift relative to the optical axis Ma of the projection system M. In FIG. 35, the projection image F is disposed so that the upper end thereof may coincide with the optical axis Ma of the projection system M.

The letter α indicates the emergence projection angle in the vertical direction of the outermost off-axial upper ray Mu and lever ray ML of the projection image F (the angle formed between the outermost off-axial principal rays Mu and ML in the vertical direction) when the projection system M is a single member. In FIG. 35, α=18°.

In the present embodiment, the upper end of the projection image F is coincident with the optical axis Ma of the projection system M and therefore, the outermost off-axial lower ray ML is coincident with the optical axis Ma.

The letters Cu and CL designate the outermost off-axial upper ray and lower ray in the vertical direction from the projection image when the additional optical system C is inclined and disposed forwardly of the projection system M. θ indicates the angle formed between the optical axis Ca of the additional optical system C and the lower ray ML when the projection system M is a single member. In FIG. 35, θ=9°.

In the present embodiment, in an area wherein the emergence projection angle from the optical axis Ma of the projection system M is great, the additional optical system C is disposed while being inclined by a predetermined angle (in FIG. 35, θ degrees) with respect to the optical axis Ma of the projection system M. Thereby, when the off-axial light flux in the vertical direction is incident on the additional optical system C, the difference in the incidence height from the optical axis of the additional optical system C is made small and the distortion of the projected image is made small. Particularly in the present embodiment, the angular element is set so that the aforementioned angles α and θ0 may be $$\alpha/3 \leq \theta \leq 2\alpha/3.$$

Thereby the distortion of the projected image is made small.

If the lower limit of the above conditional expression is exceeded, things will not differ much from a case where the additional optical system C is disposed parallel to (coaxially with) the optical axis Ma of the projection system M and the distortion of the projected image will increase, and this is not good. If the upper limit of the above conditional expression is exceeded, the incidence height of the off-axial ray onto the additional optical system C will become great and the distortion of the projected image will increase, and this is not good.

Where use is made of the projection system and additional optical system of a numerical value embodiment which will be described later, the result of the measurement of the distortion of the projected image when the additional optical system is mounted coaxially with the optical axis of the projection system and when the additional optical system is mounted while being inclined by a predetermined angle as in the present invention will be shown in Table 1 below.

TABLE 1

|  | Distortion | |
| --- | --- | --- |
|  | W1 | W1 |
| When inclined by θ | 4.4% | 5.0% |
| When disposed coaxially | 5.4% | 12.0% |

Figure 36:
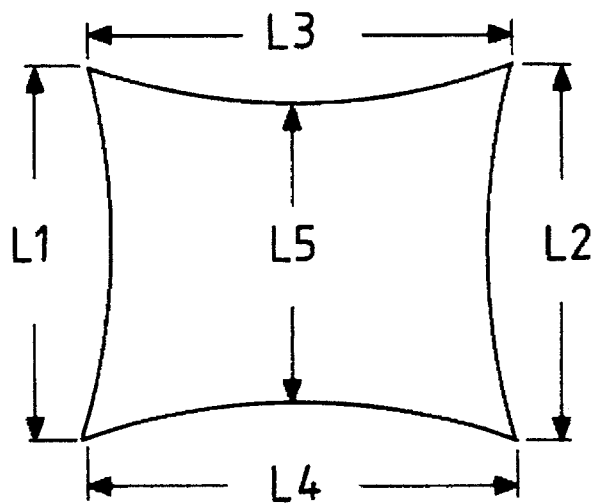
FIG. 36 is an illustration showing the distortion of a projected image.

In Table 1, when the vertical and horizontal lengths of the projected image are determined as shown in FIG. 36 and vertical distortion is W1 and horizontal distortion is W2, W1 and W2 are defined as follows:

$$W1 = \frac{L1 + L2 - 2 \times L5}{L1 + L2} \times 100$$

$$W2 = \frac{L3 - L4}{L3} \times 100$$

At this time, the distortion W1 corresponds to generally called TV distortion and the distortion W2 corresponds to the degree of asymmetry of the projection picture plane.

Figure 40A:
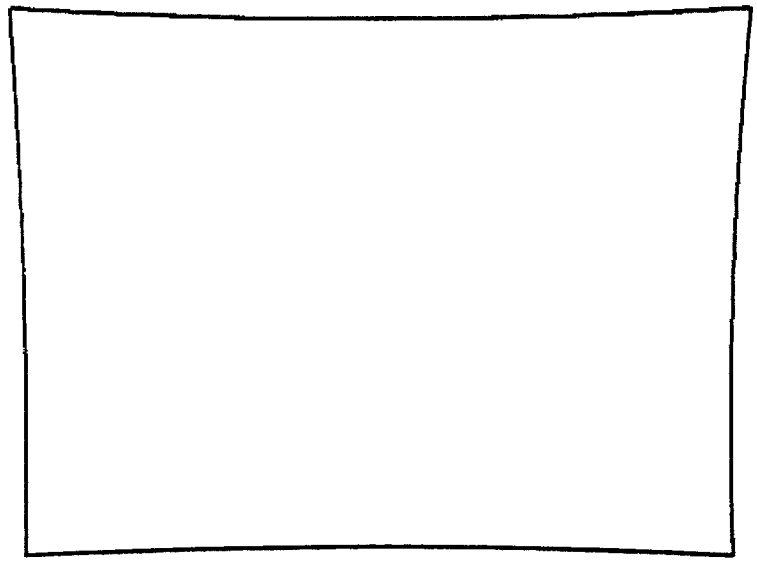
FIGS. 40A and 40B are illustrations showing the distortion of a projected image.
Figure 40B:
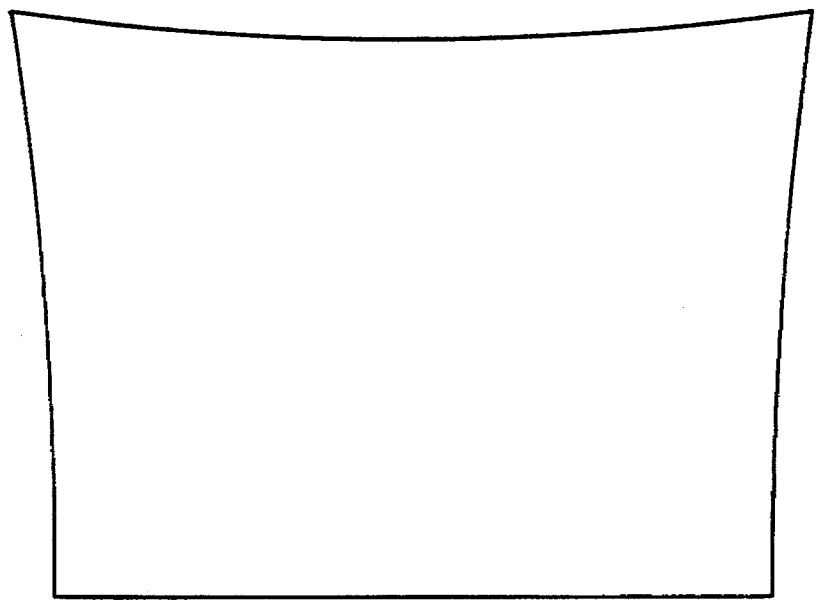

FIG. 40A shows the projected image by the present invention when a rectangular image is used as the projection image, and FIG. 40B shows a projected image similar to FIG. 40A when the additional optical system is made coaxial with the projection system.

As shown in Table 1 and FIG. 40A, it is apparent that according to the present invention, the distortion of the projected image becomes smaller.

In the present embodiment, if the additional optical system is a spherical system, for example, a wide converter, when the additional optical system is mounted with its optical axis Ca inclined with respect to the optical axis Ma of the projection system, it is preferable in terms of aberration correction that the center of rotation thereof be near the exit pupil of the projection system. Also, when the projection system is a zoom lens and the position of the exit pupil is not changed by magnification change, it is preferable that the center of rotation be near the exit pupil, and when the position of the exit pupil is fluctuated by a magnification change, it is preferable that the center of rotation be set near the exit pupil on the wide angle side.

Where a projection image, compressed and recorded in a horizontal direction, is used as the projection image, the additional optical system is comprised of an anamorphic system having the optical function of expanding an image in a horizontal direction. In this case, a similar effect will be provided even if the center of rotation of the additional optical system is not near the exit pupil as previously described.

Figure 37A:
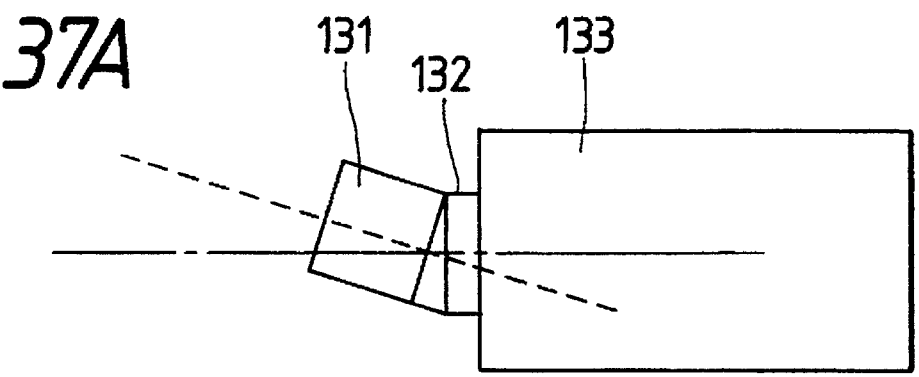
FIGS. 37A and 37B are schematic views of a projection apparatus having the additional optical system of the present invention.
Figure 37B:
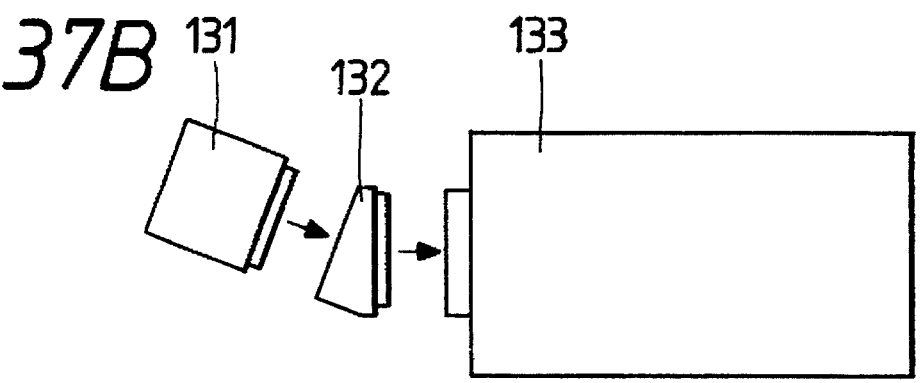
Figure 38:
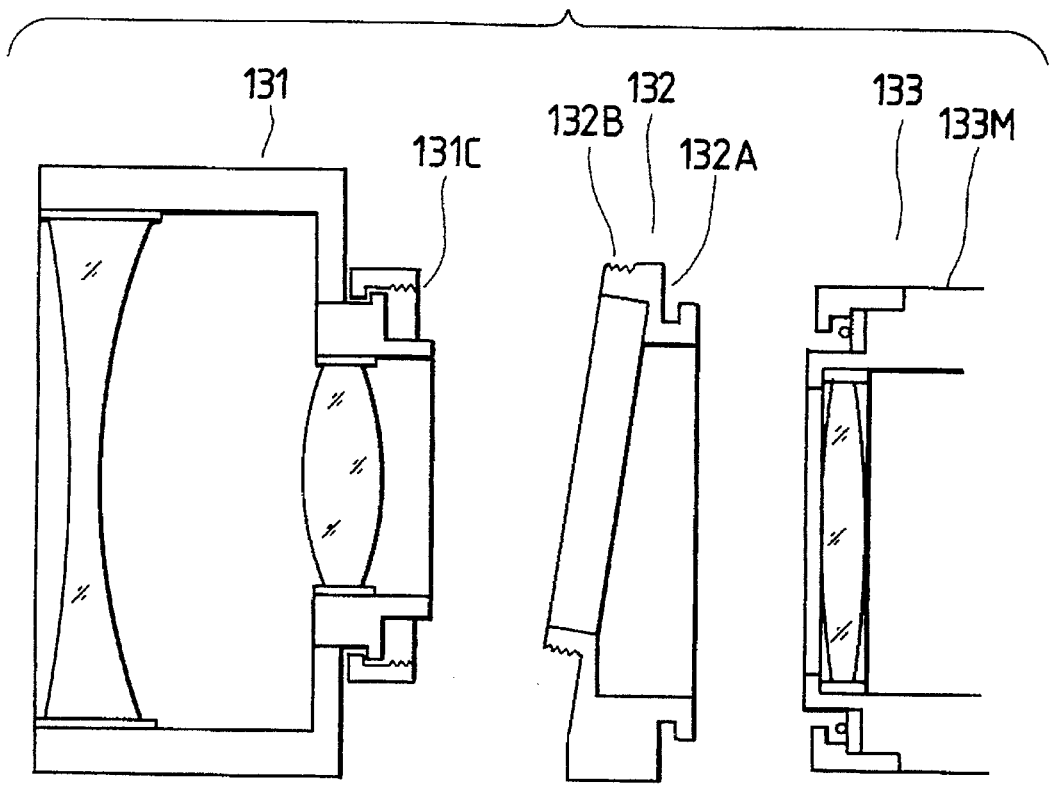
FIG. 38 is an enlarged illustration of portions of FIG. 37.

FIGS. 37A and 37B are schematic views of a projection apparatus having the additional optical system of the present invention, and FIG. 38 is a schematic view of a mount portion when an additional optical system body 131 is coupled to the projection body 133 of FIG. 37 through angle setting means 132.

In these figures, the projection body 133 contains a projection system and illuminating means therein. The additional optical system body 131 is mounted at a predetermined angle forwardly of the projection body 133 through the angle setting means 132. One of the angle setting means 132 has a mount portion 132A having a predetermined opening coupled to the mount portion 133M of the barrel of the projection body 133. The other of the angle setting means 132 is of such a shape that it is coupled to the additional optical system body 131 at a predetermined angle, and has a threaded portion 132B coupled to the threaded portion 131C of the additional optical system body 131.

In the present embodiment, the additional optical system body 131 is mounted at a predetermined angle forward of the projection body 133 while being given a predetermined angle by the use of such angle setting means 132.

Figure 39:
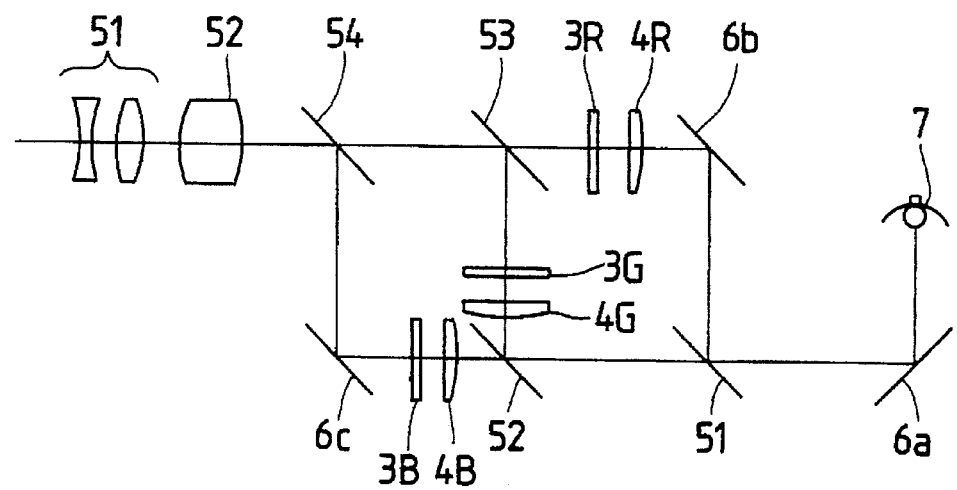
FIG. 39 is a schematic view of the essential portions of an optical system according to an embodiment of the present invention.

FIG. 39 is a schematic view of the essential portions of the projection apparatus of the present invention. In the present embodiment, an image formed on color liquid crystal is used as the projection image.

In FIG. 39, the reference numeral 52 designates a projection system, and the reference numeral 51 denotes an additional optical system mounted at a predetermined angle forward of the projection system 52. The reference numeral 7 designates a white light source emitting a collimated light beam. 3R, 3G and 3B denote liquid crystal display elements (liquid crystal light valves) for red, green and blue, respectively. The liquid crystal light values (LCDS) 3R, 3G and 3B each comprise an element whose light transmittance or reflectance is varied by a control signal, and modulate the light from the light source and form an image.

4R, reference characters 4G and 4B designate field lenses for efficiently illuminating the liquid crystal light valves 3R, 3G and 3B, respectively. The reference characters 6a, 6b and 6c denote reflecting mirrors, and the reference numeral 51 designates a red-reflecting dichroic mirror which illuminates the liquid crystal display element 3R for red. The reference numerals 52 and 53 denote green-reflecting dichroic mirrors which illuminate and reflect the liquid crystal display element 3G for green.

The liquid crystal display element 3B for blue is illuminated by blue light passed through the red-reflecting dichroic mirror 51 and the green-reflecting dichroic mirror 52. The reference numeral 54 designates a blue-reflecting dichroic mirror. The light source 7, the reflecting mirrors 6a, 6b, 6c and the dichroic mirrors 51, 52, 53, 54 each constitute an element of illuminating means.

In FIG. 39, the white light from the white light source 7 is color-resolved into red, green and blue lights by the dichroic mirrors 51, 52, 53 and 54, and the liquid crystal display elements 3R, 3G and 3B for red, green and blue, respectively, are illuminated by these red, green and blue lights, respectively, and the images of the liquid crystal display elements 3R, 3G and 3b based on these color lights are superposedly projected onto the surface of the screen S by the projection system 2 and the additional optical system 1, as shown in FIG. 35, whereby a color image is obtained.

The projection apparatus having the additional optical system of the present invention is not restricted to the embodiment of FIG. 39, but the present invention is equally applicable to a modification of the FIG. 39 embodiment and a projection apparatus or the like for projecting a single projection image.

A numerical value embodiment of the additional optical system and projection system of FIG. 35 according to the present invention will be shown below. In the numerical value embodiment, Ri represents the radius of curvature of the ith lens surface from the screen side, Di represents the thickness and air gap of the ith lens from the screen side, and Ni and vi represent the refractive index and Abbe number, respectively, of the glass of the ith lens from the screen side.

| (Numerical Value Embodiment) | | | |
|---|---|---|---|
| Additional Optical System 0.75x | | | |
| R1 = −2.208 | D1 = 0.054 | N1 = 1.69979 | v1 = 55.5 |
| R2 = 0.836 | D2 = 0.141 | N2 = 1.72311 | v2 = 29.5 |
| R3 = 2.413 | D3 = 0.434 | | |
| R4 = 3.132 | D4 = 0.101 | N3 = 1.51825 | v3 = 64.2 |
| R5 = −0.993 | D5 = 0.032 | N4 = 1.81265 | v4 = 25.4 |
| R6 = −1.397 | D6 = 0.07 | | |
| Projectin system F = 1   FNO = 5.7   ω = 0°~18° | | | |
| R7 = 1.219 | D7 = 0.024 | N5 = 1.81265 | v5 = 25.4 |
| R8 = 0.593 | D8 = 0.079 | N6 = 1.51825 | v6 = 64.2 |
| R9 = −1.492 | D9 = 0.001 | | |
| R10 = 0.561 | D10 = 0.044 | N7 = 1.51825 | v7 = 64.2 |

-continued

| (Numerical Value Embodiment) | | | |
|---|---|---|---|
| R11 = 6.678 | D11 = 0.031 | | |
| R12 = 4.235 | D12 = 0.016 | N8 = 1.77621 | v8 = 49.6 |
| R13 = 0.451 | D13 = 0.048 | | |
| R14 = −0.507 | D14 = 0.016 | N9 = 1.77621 | v9 = 49.6 |
| R15 = 0.348 | D15 = 0.045 | N10 = 1.85501 | v10 = 23.9 |
| R16 = 5.362 | D16 = 0.293 | | |
| R17 = stop | D17 = 0.007 | | |
| R18 = 1.675 | D18 = 0.021 | N11 = 1.69979 | v11 = 55.5 |
| R19 = −8.001 | D19 = 0.001 | | |
| R20 = 0.466 | D20 = 0.630 | N12 = 1.71615 | v12 = 53.8 |
| R21 = 1.316 | D21 = 0.081 | | |
| R22 = −0.726 | D22 = 0.116 | N13 = 1.73429 | v13 = 28.5 |
| R23 = 0.726 | D23 = 0.019 | | |
| R24 = −585.529 | D24 = 0.030 | N14 = 1.71615 | v14 = 53.8 |
| R25 = −0.736 | D25 = 0.001 | | |
| R26 = 1.855 | D26 = 0.037 | N15 = 1.71615 | v15 = 53.8 |
| R27 = −0.942 | | | |

According to the present invention, there can be achieved a projection apparatus having an additional optical system in which, as described previously, a projection image is disposed with a vertical shift relative to the optical axis of a projection system and the additional optical system is mounted forward of the projection system and when the projection image is to be enlarged in an oblique direction and projected with the size thereof changed variously, the optical arrangement of the projection system and additional optical system is appropriately set, whereby any curvature of image field that occurs is small and a projected image of good quality is obtained.

What is claimed is:

1. A projection apparatus for producing an enlarged projection of an original image onto the surface of a screen, comprising:

master lens means, having an optical axis and being capable of zooming along the optical axis, for projecting the original image;

auxiliary lens means disposed on the screen side of said master lens and having an optical axis that is capable of being inclined with respect to the optical axis of said master lens means; and means for varying an inclination of said auxiliary lens means relative to the optical axis of said master lens means in response to a zooming of said master lens means.

2. A projection apparatus according to claim 1, wherein said auxiliary lens means is an anamorphic lens having refractive power in a first direction that is perpendicular to the optical axis of said master lens means.

3. A projection apparatus according to claim 2, which satisfies the following conditional expression:

$$(\tfrac{1}{3})\cdot\alpha \leq \theta \leq (\tfrac{2}{3})\cdot\alpha,$$

where θ is the angle formed between the optical axis of said master lens means and the optical axis of said auxiliary lens means, and α is a projection angle about the optical axis of said master lens means of the enlarged projection by said projection apparatus in a second direction that is perpendicular to both the first direction and the optical axis of said master lens means.

4. A projection apparatus according to claim 2, wherein said anamorphic lens comprises, in succession from the screen side, a first lens unit having negative refractive power in the first direction.

5. A projection apparatus according to claim 4, wherein a center of said original image deviates relative to the optical axis of said master lens means.

6. A projection apparatus according to claim 1, wherein a center of inclination of said auxiliary lens means is near an exit pupil of said master lens means.

7. A projection apparatus comprising:

a liquid crystal display means;

illumination means for illuminating said liquid crystal display means;

master lens means, having an optical axis, for projecting light coming from said liquid crystal display means onto a screen;

auxiliary lens means being disposed at the screen side of said master lens means and rotatable around a predetermined axis; and means for varying the inclination of said auxiliary lens means relative to the optical axis of said master lens means in response to a zooming of said master lens means.

8. A projection apparatus according to claim 7, wherein said auxiliary lens means comprises an anamorphic lens having refractive power in a direction perpendicular to the optical axis of said master lens means.

* * * * *

UNITED STATES PATENT AND TRADEMARK OFFICE
CERTIFICATE OF CORRECTION

PATENT NO. : 5,648,871
DATED : July 15, 1997
INVENTOR(S) : ATSUSHI OKUYAMA, ET AL.

It is certified that error appears in the above-indentified patent and that said Letters Patent is hereby corrected as shown below:

COLUMN 1:

Line 50, "fluxes" should read --flux--.

COLUMN 4:

Line 9, "angle e" should read --angle $\theta$--.

COLUMN 10:

Line 19, "anglewith" should read --angle with--.

COLUMN 11:

Line 35, "$\theta 0$" should read --$\theta$--.

COLUMN 13:

Line 8, "values" should read --valves--;
    Line 13, "4R, reference characters" should read --Reference characters 4R,--; and
    Line 62, "Projectin" should read --Projection--.

UNITED STATES PATENT AND TRADEMARK OFFICE
CERTIFICATE OF CORRECTION

PATENT NO. : 5,648,871  Page 2 of 2
DATED : July 15, 1997
INVENTOR(S) : ATSUSHI OKUYAMA, ET AL.

It is certified that error appears in the above-identified patent and that said Letters Patent is hereby corrected as shown below:

COLUMN 14:

Line 64, "direction." should read --direction, and a second lens unit having positive refractive power in the first direction.--.

Signed and Sealed this

Twelfth Day of May, 1998

Attest:

BRUCE LEHMAN

Attesting Officer   Commissioner of Patents and Trademarks